US010244222B2

(12) United States Patent
Bridges

(10) Patent No.: US 10,244,222 B2
(45) Date of Patent: *Mar. 26, 2019

(54) TRIANGULATION SCANNER AND CAMERA FOR AUGMENTED REALITY

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,494

(22) Filed: Dec. 4, 2017

(65) Prior Publication Data

US 2018/0091792 A1  Mar. 29, 2018

Related U.S. Application Data

(63) Continuation of application No. 15/594,752, filed on May 15, 2017, now Pat. No. 9,843,784, which is a
(Continued)

(51) Int. Cl.
 *H04N 13/122* (2018.01)
 *H04N 13/204* (2018.01)
(Continued)

(52) U.S. Cl.
 CPC ......... *H04N 13/122* (2018.05); *G01B 11/005* (2013.01); *G01C 3/08* (2013.01);
(Continued)

(58) Field of Classification Search
 CPC .......................... H04N 13/122; H04N 13/204
 See application file for complete search history.

(56) References Cited

U.S. PATENT DOCUMENTS 5,402,582 A  4/1995  Raab
5,611,147 A  3/1997  Raab
(Continued)

FOREIGN PATENT DOCUMENTS

EP  0631250 A2  12/1994
EP  1033679 A1   9/2000
(Continued)

OTHER PUBLICATIONS

Geng, J., et al., "DLP-based structured light 3D imaging technologies and applications", Emerging Digitial Micromirror Device Based Systems and Applications III, Spie, vol. 7932, No. 1, Feb. 10, 2011 (Feb. 10, 2011) 15 pgs.
(Continued)

*Primary Examiner* — Ibrahim Siddo
(74) *Attorney, Agent, or Firm* — Cantor Colburn LLP

(57) ABSTRACT

A method and system of combining 2D images into a 3D image. The method includes providing a coordinate measurement device and a triangulation scanner having an integral camera associated therewith, the scanner being separate from the coordinate measurement device. In a first instance, the coordinate measurement device determines the position and orientation of the scanner and the integral camera captures a first 2D image. In a second instance, the scanner is moved, the coordinate measurement device determines the position and orientation of the scanner, and the integral camera captures a second 2D image. A common feature point in the first and second images is found and is used, together with the first and second images and the positions and orientations of the scanner in the first and second instances, to create the 3D image.

19 Claims, 20 Drawing Sheets

Related U.S. Application Data continuation of application No. 15/350,210, filed on Nov. 14, 2016, now Pat. No. 9,661,295, which is a continuation of application No. 14/960,626, filed on Dec. 7, 2015, now Pat. No. 9,506,744.

(60) Provisional application No. 62/092,371, filed on Dec. 16, 2014.

(51) Int. Cl.
  *G01B 11/00* (2006.01)
  *H04N 13/257* (2018.01)
  *H04N 13/275* (2018.01)
  *G06T 1/00* (2006.01)
  *G02B 27/01* (2006.01)
  *G01C 3/08* (2006.01)
  *G01S 3/786* (2006.01)

(52) U.S. Cl.
  CPC .......... *G01S 3/786* (2013.01); *G02B 27/0172* (2013.01); *G06T 1/0007* (2013.01); *H04N 13/204* (2018.05); *H04N 13/257* (2018.05); *H04N 13/275* (2018.05); *G02B 2027/0138* (2013.01)

(56) References Cited

U.S. PATENT DOCUMENTS

| | | | |
|---|---|---|---|
| 5,821,943 A | 10/1998 | Shashua | |
| 6,175,647 B1 | 1/2001 | Schick et al. | |
| 6,271,855 B1 | 8/2001 | Shum et al. | |
| 6,421,629 B1 | 7/2002 | Ishiyama | |
| 6,711,293 B1 | 11/2004 | Lowe | |
| 7,352,446 B2 | 4/2008 | Bridges et al. | |
| 7,800,758 B1 | 9/2010 | Bridges et al. | |
| 7,804,602 B2 | 9/2010 | Raab | |
| 7,952,728 B2 | 5/2011 | Ibach et al. | |
| 8,081,297 B2 | 12/2011 | Bridges et al. | |
| 8,237,934 B1 | 8/2012 | Cooke et al. | |
| 8,467,072 B2 | 6/2013 | Cramer et al. | |
| 8,525,983 B2 | 9/2013 | Bridges et al. | |
| 8,533,967 B2 | 9/2013 | Bailey et al. | |
| 9,064,312 B2 | 6/2015 | Majumder et al. | |
| 9,091,536 B2 | 7/2015 | Hausler | |
| 9,158,875 B2 | 10/2015 | Morgana et al. | |
| 9,402,070 B2 | 7/2016 | Tohme et al. | |
| 9,661,295 B2* | 5/2017 | Bridges ............... G01B 11/005 | |
| 9,772,173 B2 | 9/2017 | Atwell et al. | |
| 2002/0094134 A1 | 7/2002 | Nafis et al. | |
| 2003/0071194 A1 | 4/2003 | Mueller et al. | |
| 2005/0088435 A1 | 4/2005 | Geng | |
| 2005/0166413 A1 | 8/2005 | Crampton | |
| 2006/0182314 A1 | 8/2006 | England et al. | |
| 2007/0091174 A1 | 4/2007 | Kochi et al. | |
| 2008/0024484 A1 | 1/2008 | Naimark | |
| 2008/0075324 A1 | 3/2008 | Sato et al. | |
| 2010/0026982 A1 | 2/2010 | Kludas et al. | |
| 2011/0090337 A1 | 4/2011 | Klomp et al. | |
| 2011/0157373 A1 | 6/2011 | Ye | |
| 2011/0178764 A1* | 7/2011 | York ..................... G01B 5/008 702/152 |
| 2012/0050477 A1 | 3/2012 | Karaoguz et al. | |
| 2012/0050478 A1 | 3/2012 | Karaoguz et al. | |
| 2012/0148100 A1 | 6/2012 | Kotake et al. | |
| 2012/0182294 A1 | 7/2012 | Cordon et al. | |
| 2012/0206716 A1 | 8/2012 | Cramer et al. | |
| 2012/0257017 A1 | 10/2012 | Pettersson et al. | |
| 2012/0262550 A1* | 10/2012 | Bridges ............... G01C 15/002 348/46 |
| 2012/0281087 A1 | 11/2012 | Kruse | |
| 2013/0027515 A1 | 1/2013 | Vintner et al. | |
| 2013/0063563 A1 | 3/2013 | Pulla et al. | |
| 2013/0096873 A1 | 4/2013 | Rosengaus et al. | |
| 2013/0155047 A1 | 6/2013 | Williams et al. | |
| 2013/0238124 A1 | 9/2013 | Suzuki et al. | |
| 2013/0278727 A1 | 10/2013 | Tamir et al. | |
| 2013/0293684 A1* | 11/2013 | Becker ............... G01B 11/245 348/47 |
| 2013/0314689 A1 | 11/2013 | Jones et al. | |
| 2013/0315487 A1* | 11/2013 | Turetzky ............... G06T 19/006 382/195 |
| 2013/0329013 A1 | 12/2013 | Metois et al. | |
| 2014/0028805 A1 | 1/2014 | Tohme | |
| 2014/0063489 A1 | 3/2014 | Steffey et al. | |
| 2014/0078519 A1 | 3/2014 | Steffey et al. | |
| 2014/0104387 A1 | 4/2014 | Klusza et al. | |
| 2014/0139639 A1 | 5/2014 | Wagner et al. | |
| 2014/0176677 A1 | 6/2014 | Valkenburg et al. | |
| 2014/0192187 A1 | 7/2014 | Atwell et al. | |
| 2014/0267614 A1 | 9/2014 | Ding et al. | |
| 2014/0267620 A1 | 9/2014 | Bridges | |
| 2015/0002659 A1 | 1/2015 | Atwell | |
| 2015/0075018 A1 | 3/2015 | Bridges | |
| 2015/0130906 A1 | 5/2015 | Bridges | |
| 2015/0365653 A1* | 12/2015 | Tohme ............... G01B 11/14 348/46 |
| 2015/0373321 A1 | 12/2015 | Bridges | |
| 2016/0093099 A1 | 3/2016 | Bridges | |
| 2016/0171776 A1 | 6/2016 | Bridges | |
| 2016/0335796 A1 | 11/2016 | Roimela | |
| 2016/0335803 A1 | 11/2016 | Tohme et al. | |
| 2017/0067734 A1 | 3/2017 | Heidemann et al. | |

FOREIGN PATENT DOCUMENTS

| | | |
|---|---|---|
| EP | 2031558 A2 | 3/2009 |
| JP | 2009058503 A | 3/2009 |
| JP | 2011085971 A | 4/2011 |
| JP | 2014514563 A | 6/2014 |
| WO | 2011134083 A1 | 11/2011 |

OTHER PUBLICATIONS http://en.wikipedia.org/wiki/Augmented_reality (retrieved Dec. 5, 2015).

* cited by examiner

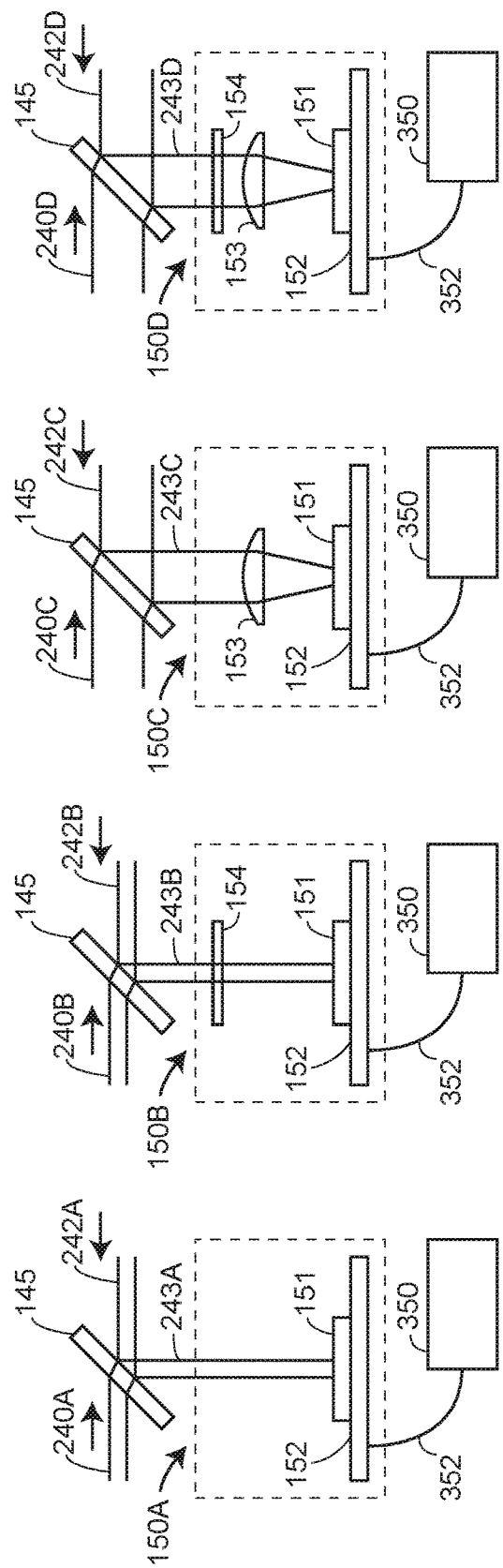

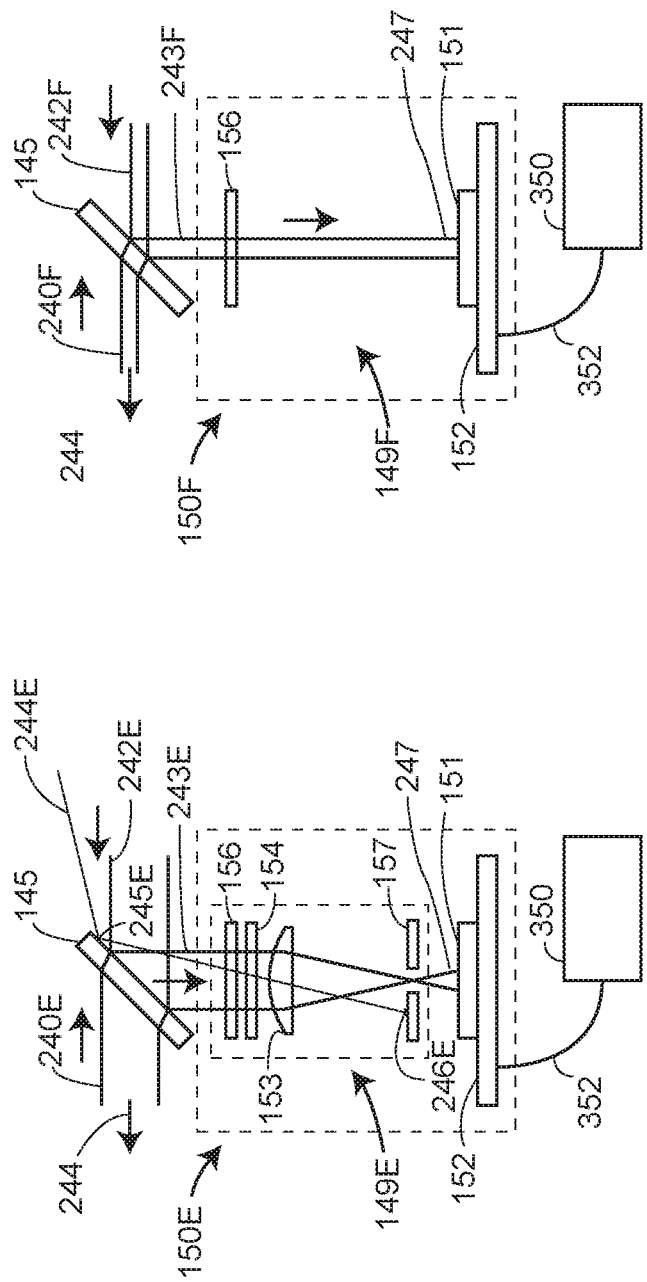

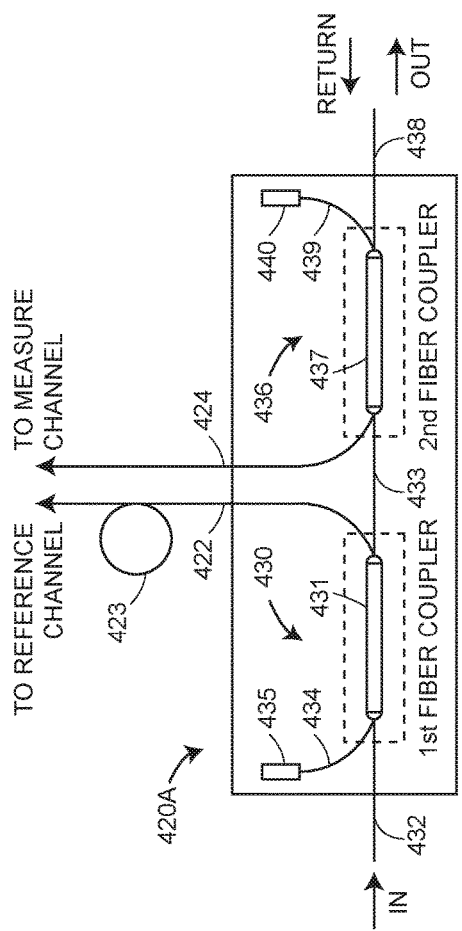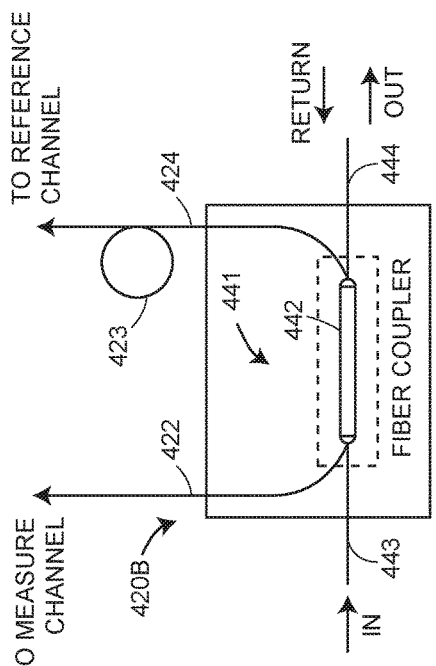

TRIANGULATION SCANNER AND CAMERA FOR AUGMENTED REALITY

CROSS-REFERENCE TO RELATED APPLICATIONS

The present application is a continuation application of U.S. application Ser. No. 15/594,752, which is a continuation application of U.S. application Ser. No. 15/350,210 filed Nov. 14, 2016, now U.S. Pat. No. 14/960,626 filed on Dec. 7, 2015, now U.S. Pat. No. 9,506,744, and claims the benefit of U.S. Provisional Application Ser. No. 62/092,371 filed on Dec. 16, 2014, the contents of which are incorporated herein by reference.

BACKGROUND

The present disclosure relates to a triangulation scanner and an integral camera configured to achieve augmented reality (AR).

One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance measuring device such as an absolute distance meter or an interferometer. The angles are measured with an angle measuring device such as an angular encoder. A gimbaled beam-steering mechanism within the instrument directs the laser beam to the point of interest.

The laser tracker is a particular type of coordinate measuring device that tracks the retroreflector target with one or more laser beams it emits. The laser tracker is thus a "time-of-flight" type of measurement device. Coordinate measuring devices closely related to the laser tracker are the laser scanner and the total station. The laser scanner steps one or more laser beams to points on a surface of an object. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of the object surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are incorporated herein by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR at any point on the surface of the object being measured.

Several laser trackers have been disclosed for measuring six, rather than the ordinary three, degrees of freedom. These six degrees of freedom include three translational degrees of freedom and three orientational degrees of freedom. Exemplary six degree-of-freedom (six-DOF or 6DOF) laser tracker systems are described by U.S. Pat. No. 7,800,758 ('758) to Bridges et al., U.S. Pat. No. 8,525,983 ('983) to Bridges et al., and U.S. Pat. No. 8,467,072 ('072) to Cramer et al., the contents of each of which are incorporated herein by reference.

An alternative to a time-of-flight measurement device such as a laser tracker is a scanning system that determines the 3D coordinates of an object surface based on triangulation principles. Systems such as laser trackers that make use of time-of-flight distance meters in some cases are relatively more accurate than triangulation scanners, but non-contact triangulation scanners may be relatively faster because they typically project a plurality of light spots onto the object surface at each instant in time.

A typical triangulation scanner projects either a line of light (e.g., light from a laser line probe) or a two-dimensional (2D) pattern of light over an area (e.g., structured light) onto the object surface. In a triangulation scanner, a camera (e.g., a CCD or CMOS photosensitive array) is coupled to a projector (e.g., a laser light source) in a fixed mechanical relationship. The projected line or pattern of light emitted from the projector is reflected off of the object surface and imaged by the camera. Since the camera and projector are arranged in a fixed relationship to each other, the distance and angles to the object surface may be determined from the projected line or pattern, the captured camera images and a baseline distance separating the projector and the camera according to trigonometric principles. Triangulation systems provide advantages in quickly acquiring 3D coordinate data over large areas.

In some systems, during the scanning process, the triangulation scanner acquires a series of 3D images, which may be registered relative to each other so that the position and orientation of each 3D image relative to the other 3D images is known. If the scanner is stationary, such image registration is not necessary. Similarly, if the triangulation scanner is attached to, or works in conjunction with, a mechanical device having the ability to measure the position and orientation of the triangulation scanner, it is not necessary to provide such image registration. Examples of such mechanical devices include laser trackers, articulated arm coordinate measurement machines (CMMs), and Cartesian CMMs.

On the other hand, where the scanner is handheld and hence movable, various techniques may be used to register the images. One common technique uses features (e.g., cardinal points) located in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing coordinate measurement devices are suitable for their intended purposes in working with triangulation scanners as described hereinabove, the need for improvement remains, particularly in improving the registration of images acquired by a triangulation scanner device.

Augmented reality (AR) is a relatively new type of technology that grew out of virtual reality. Augmented reality merges, superimposes, or transprojects actual real-world information or data with, on, into, or onto virtual information or data. That is, the virtual information or data "augments," compliments or supplements the actual sensed, measured, captured or imaged real-world information or data related to some object or scene to give the user an enhanced view or perception of the real world object or scene. Augmented reality applications include technical or industrial areas such as part, component or device manufacturing and assembly and/or repair and maintenance, and facility, building or structure layout and construction. A number of modern-day AR applications are disclosed at http://en.wikipedia.org/wiki/Augmented_reality.

The actual information or data relating to the part, component or device or area may be obtained in various ways using various devices. One type of device includes a coordinate measurement device such as, for example, a CMM or a laser tracker. A camera may also be used to take still or video images of the actual part, component or device, and/or a desired area by itself or that surrounding or associated with the part, component or device.

The virtual information or data may be stored artificial information regarding the part, component or device. The stored virtual information or data may be related to the design of the part, component or device ranging from, for example, simple text or symbols to relatively more complex, graphic 3D CAD design data. Besides visual information, the stored virtual information or data may also comprise audible or sound information or data. The stored virtual information or data may also relate to information such as textual or part, component or device repair or maintenance instructions, or visual information depicting parts, components or devices that may be used, for example, in the design of an office or manufacturing and/or repair facility (e.g., a building or facility layout).

The combined actual and virtual information or data in an AR system is usually digital in nature and may be delivered in real-time (i.e., as the actual information is being measured or sensed) to a user on a display screen that may be in many different types or forms, such as that associated with, for example, a desktop or laptop computer monitor, tablet, smartphone or even a head-mounted display such as those associated with glasses, hats or helmets. Audio information may be delivered through a speaker.

While some innovations have already been made in the area of augmented reality for use with various types of devices, there is a need for novel applications of augmented reality together with handheld triangulation scanners (e.g., structured light scanners, laser line probes) used with a laser tracker.

SUMMARY

In an embodiment of the present invention, a method and system of combining a plurality of two-dimensional (2D) images into a three-dimensional (3D) image of an object. The method comprising steps of: providing a six-degree of freedom triangulation scanner having a retroreflector and a camera; providing a laser tracker device having a distance meter, the device operable to direct a beam of light in a direction and measure a distance from the device to the retroreflector, the device further configured to determine 3D coordinates of the retroreflector; determining with the device a first 3D coordinates of the retroreflector at a first position; forming a first 2D image with the camera at the first position; determining with the device a second 3D coordinates of the retroreflector at a second position; forming a second 2D image with the camera at the second position; determining a first common feature point in the first 2D image and the second 2D image; determining 3D coordinates of the first common feature point based at least in part on the first 3D coordinates and the second 3D coordinates; generating a first composite 3D image from the first 2D image and the second 2D image based at least in part on the 3D coordinates of the first common feature point; and storing in a memory the first composite 3D image.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 6A-6D are schematic figures that show four types of prior art position detector assemblies;

FIGS. 6E and 6F are schematic figures showing position detector assemblies according to embodiments of the present invention;

FIGS. 8A and 8B are schematic figures showing fiber-optic elements within a prior art fiber-optic network;

DETAILED DESCRIPTION

Figure 1:
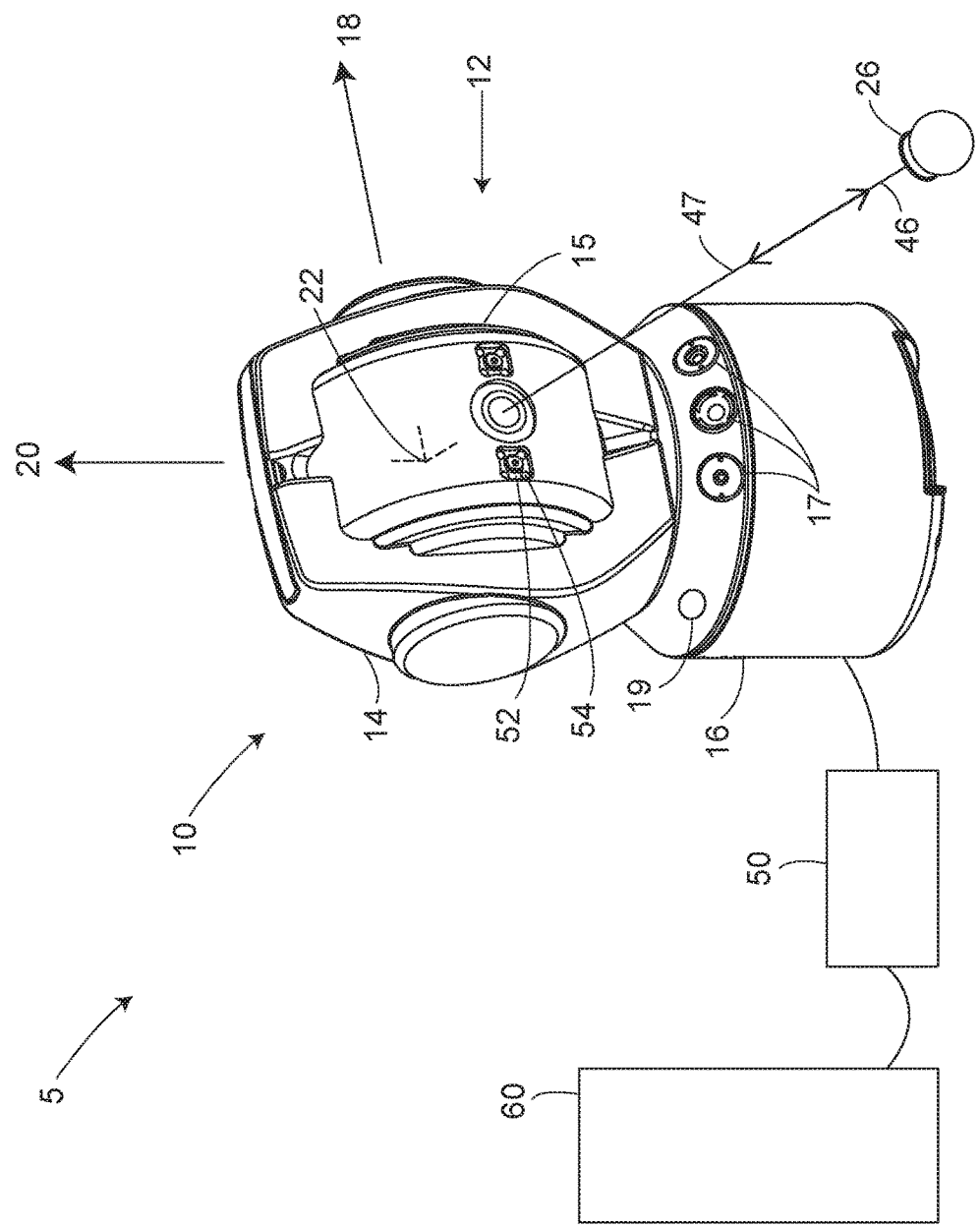
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446 ('446), the contents of which are incorporated herein by reference.

Figure 2:
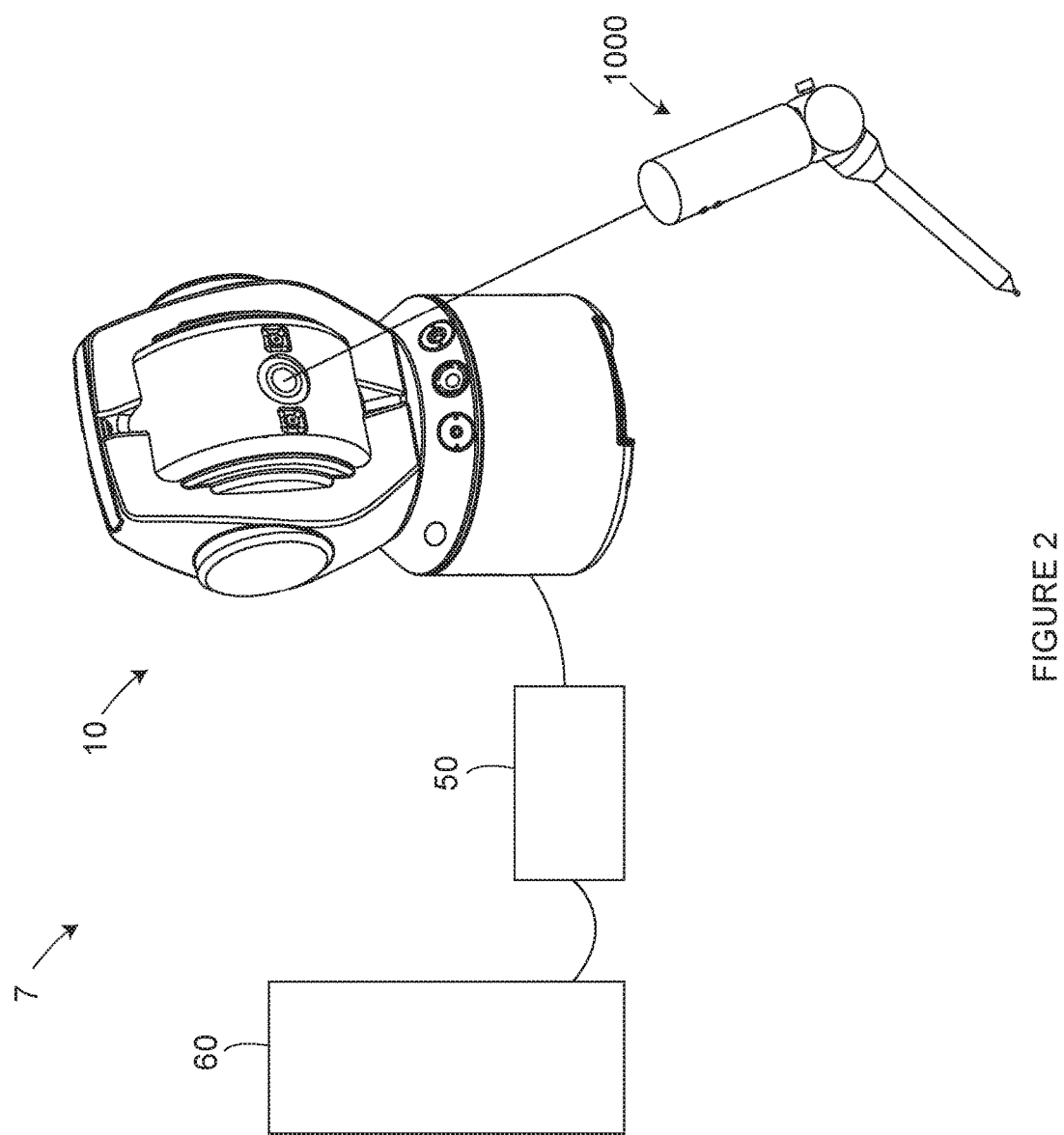
FIG. 2 is a perspective view of a laser tracker system with a six-degree of freedom (six-DOF) target.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
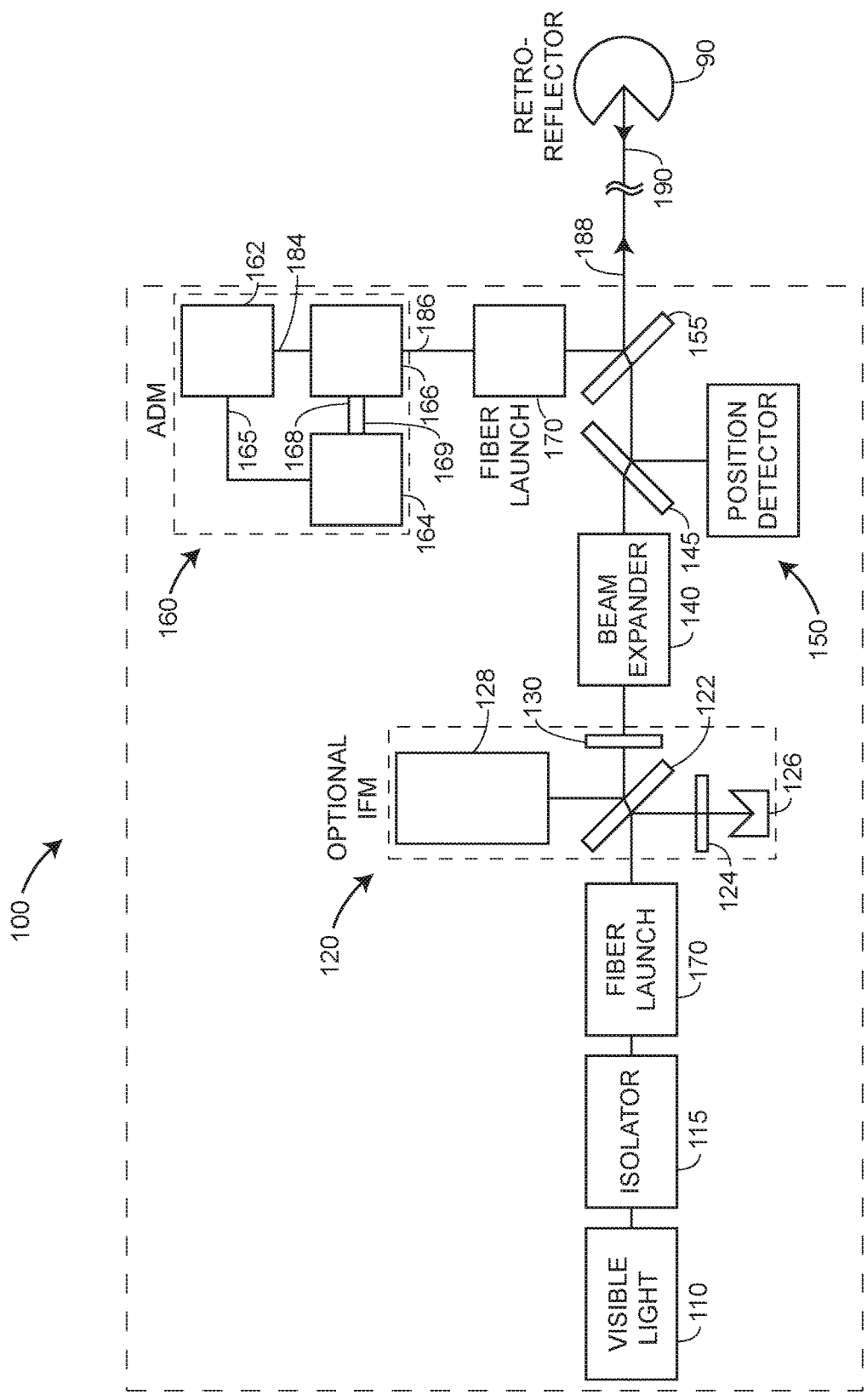
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed hereinbelow with reference to FIG. 5.

Figure 4:
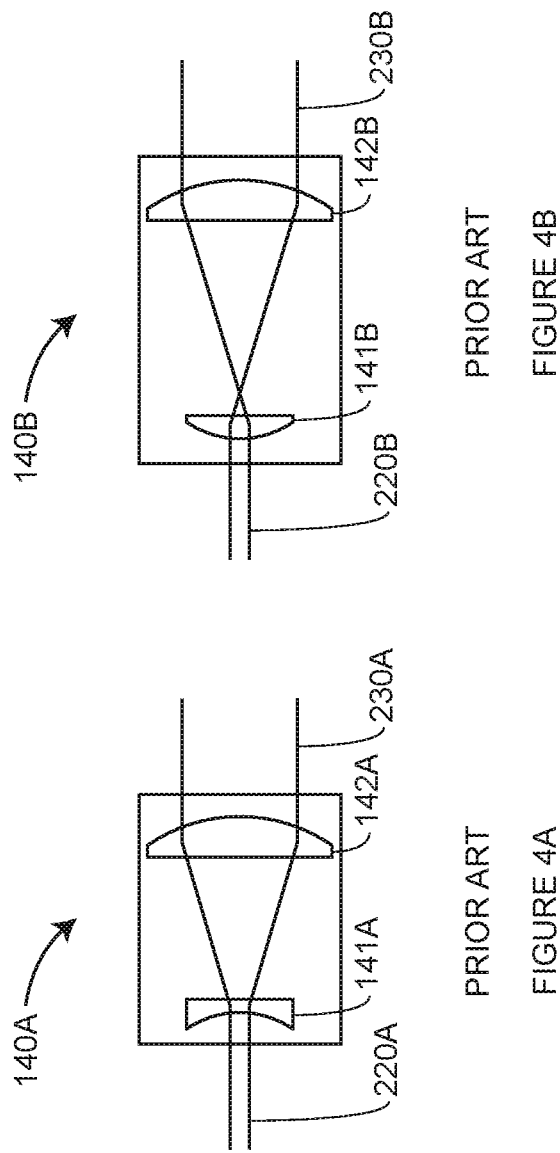
FIGS. 4A and 4B, shows two types of prior art afocal beam expanders.

Beam expander 140 may be set up using a variety of lens configurations, but two commonly used prior-art configurations are shown in FIGS. 4A and 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
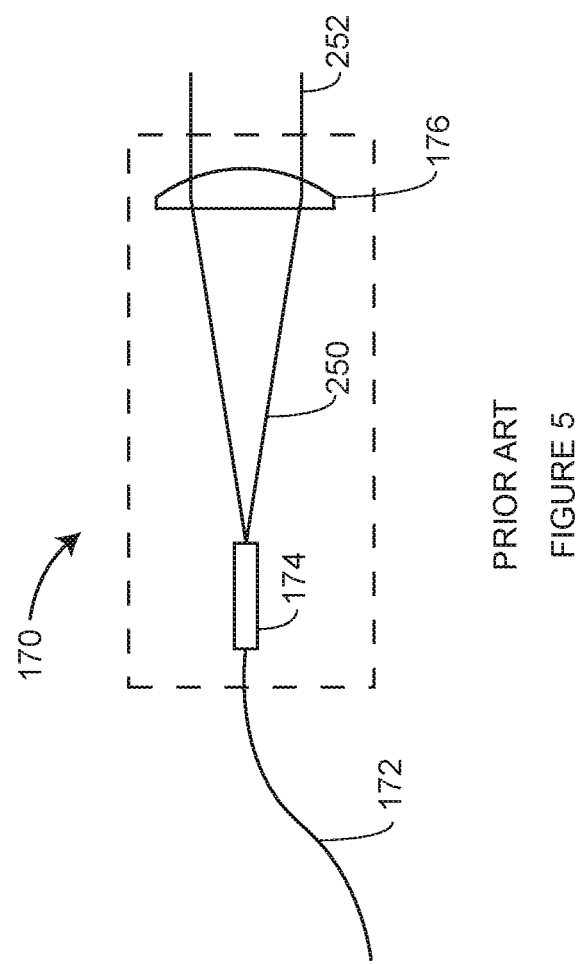
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
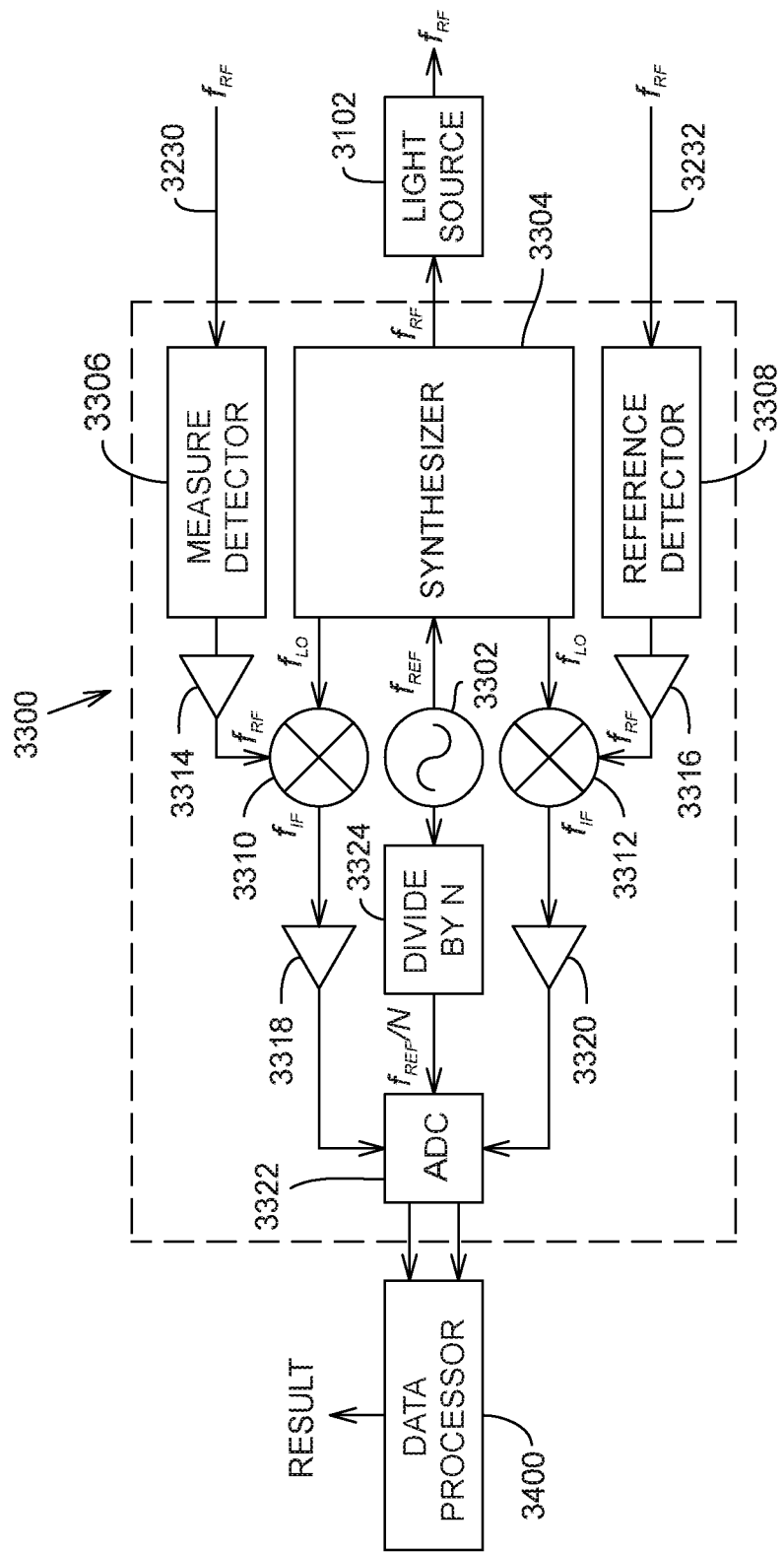
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are incorporated herein by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

FIG. 6E shows a novel position detector assembly that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
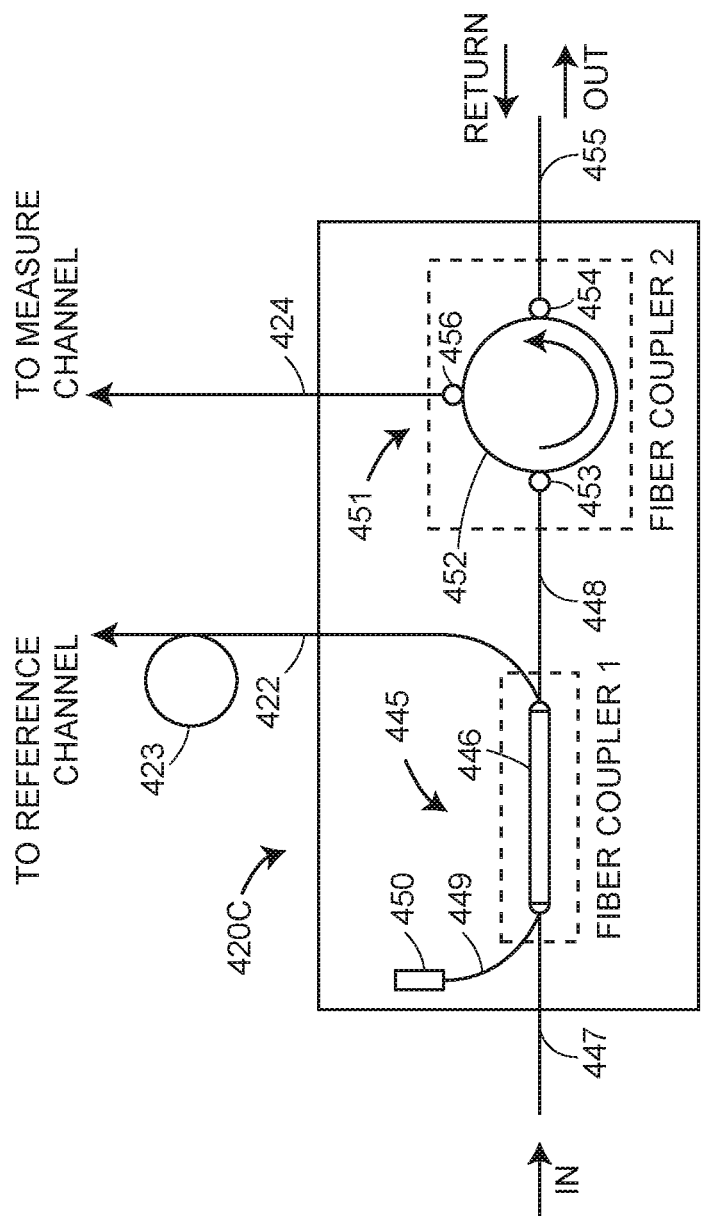
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
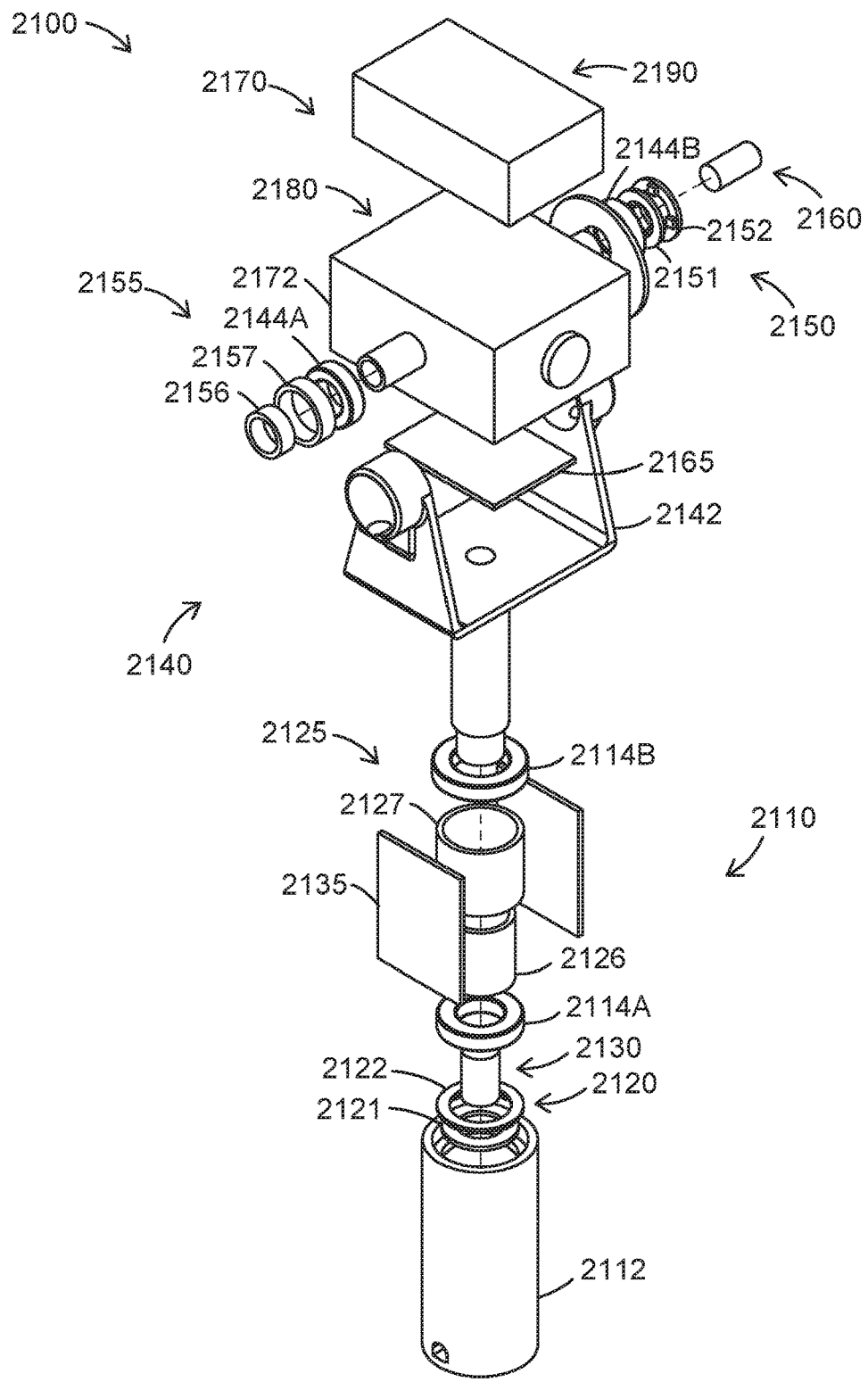
FIG. 9 is an exploded view of a prior art laser tracker.
Figure 10:
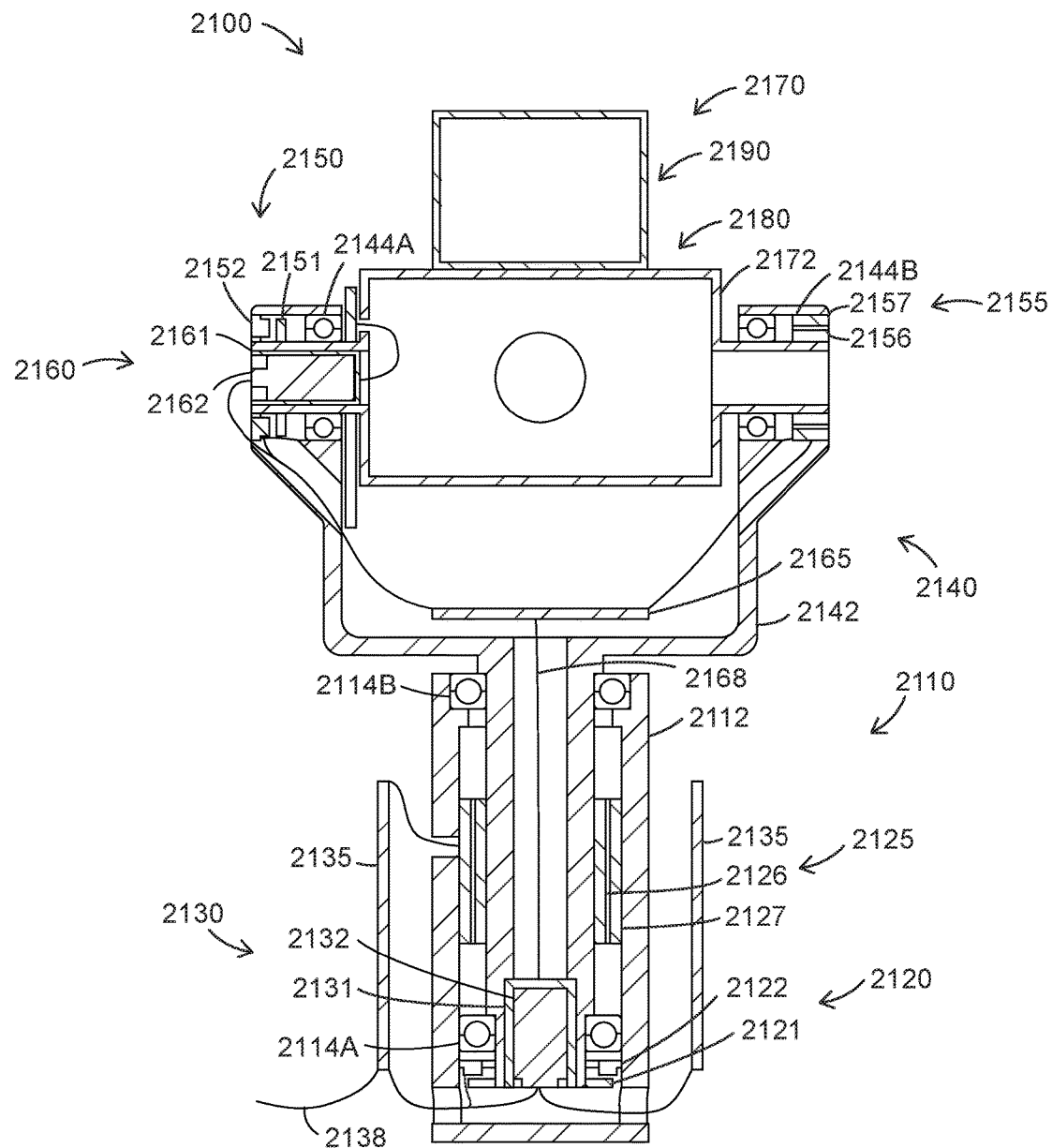
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of the aforementioned patent '983. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
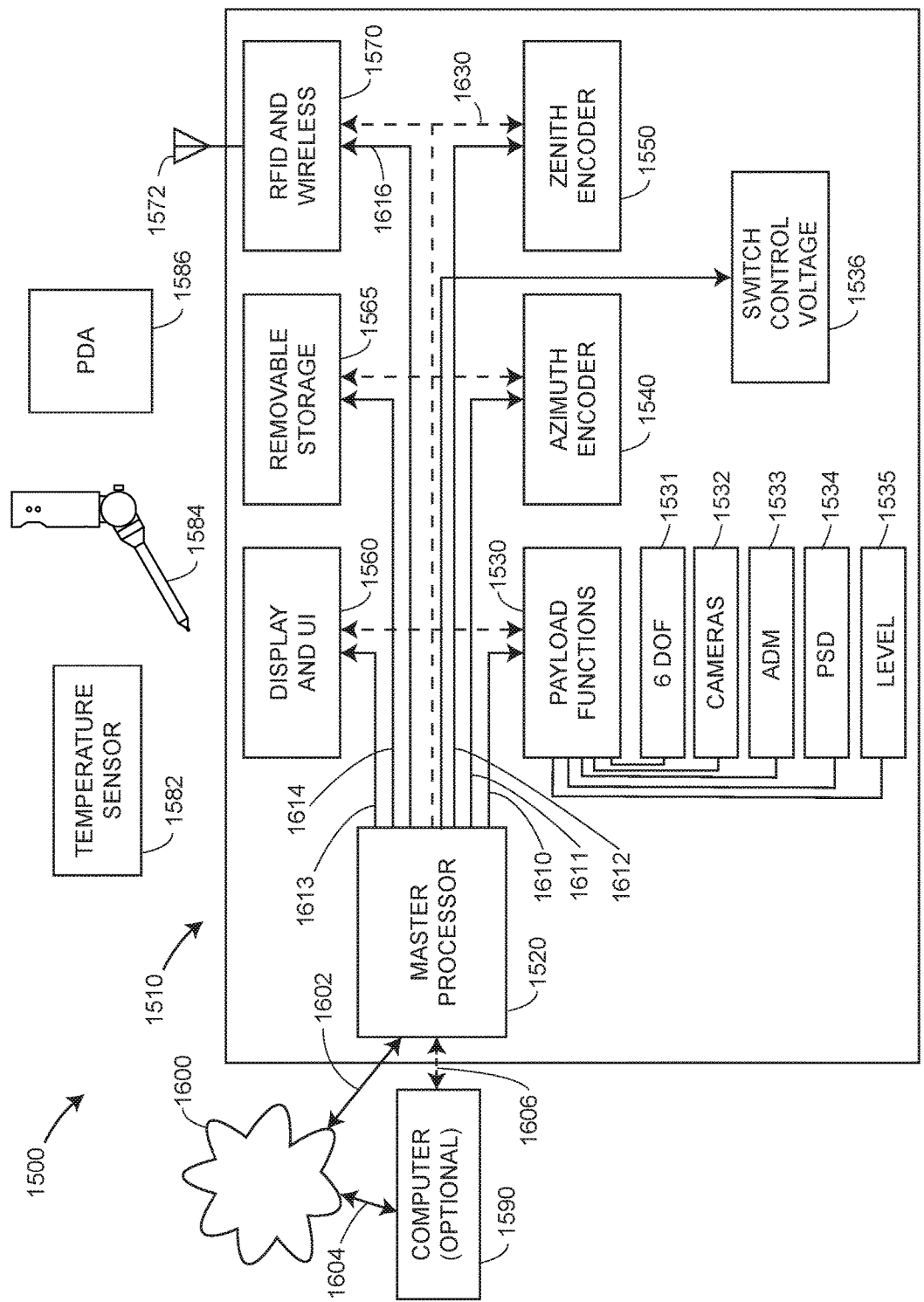
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531 (for a six-DOF system such as that shown herein and in FIG. 2), the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9 and 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. As will be discussed in more detail hereinafter in accordance with embodiments of the present invention, another type of peripheral device not shown in FIG. 11 is a triangulation scanner, in particular a three-DOF triangulation scanner, such as, for example, a laser line probe (LLP) or an area structured light scanner. The laser tracker may communicate with the peripheral devices in a variety of ways, including by wireless communication over the antenna 1572, by a vision system such as a camera, and by distance and angular readings of the laser tracker to a cooperative target such as the six-DOF probe 1584 or triangulation scanner. The peripheral devices may contain processors. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are typically separated from one another and from the payload electronics 1530 by slip rings, for example. This is why the bus lines 1610, 1611, and 1612 are depicted as separate bus lines in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three-dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
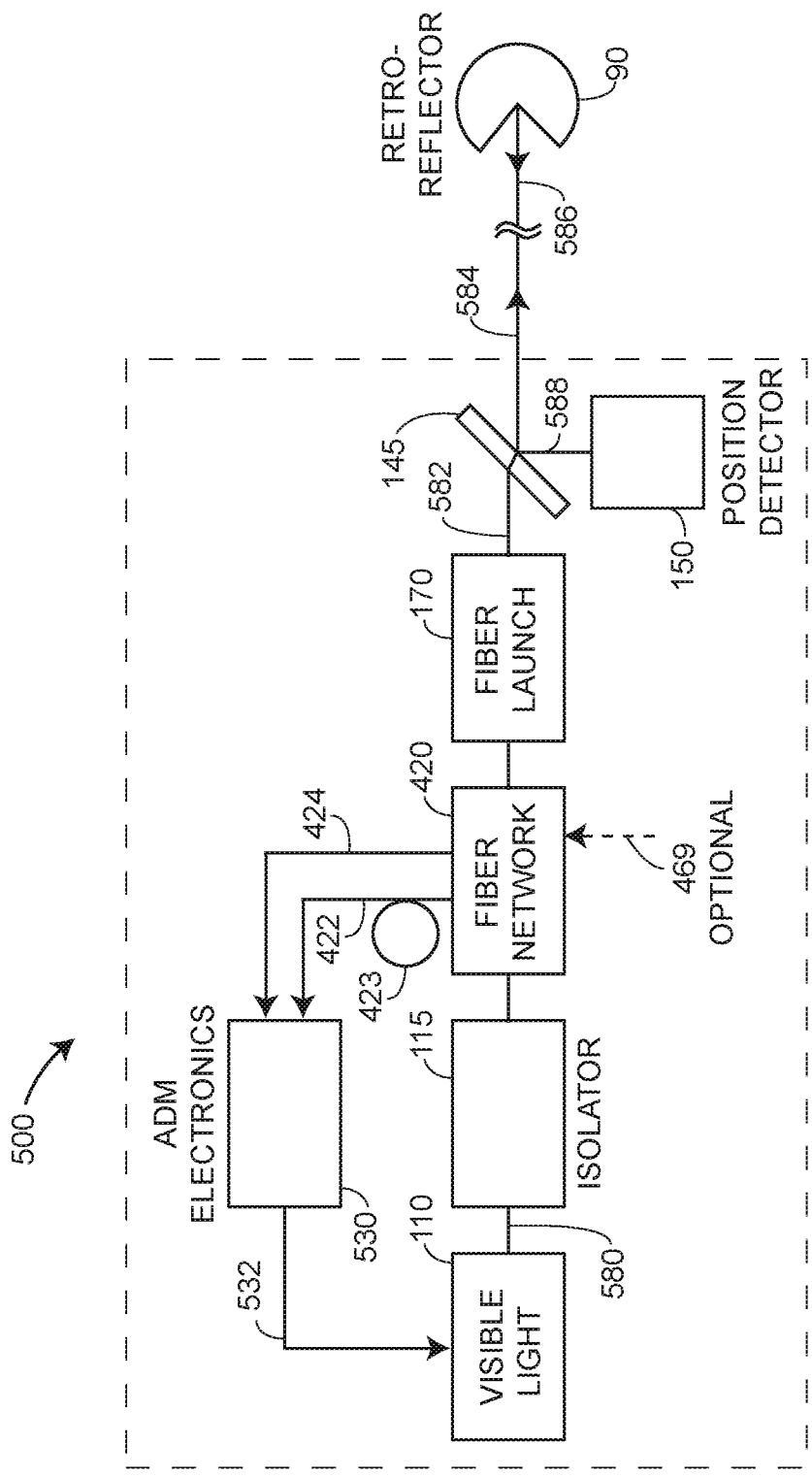
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
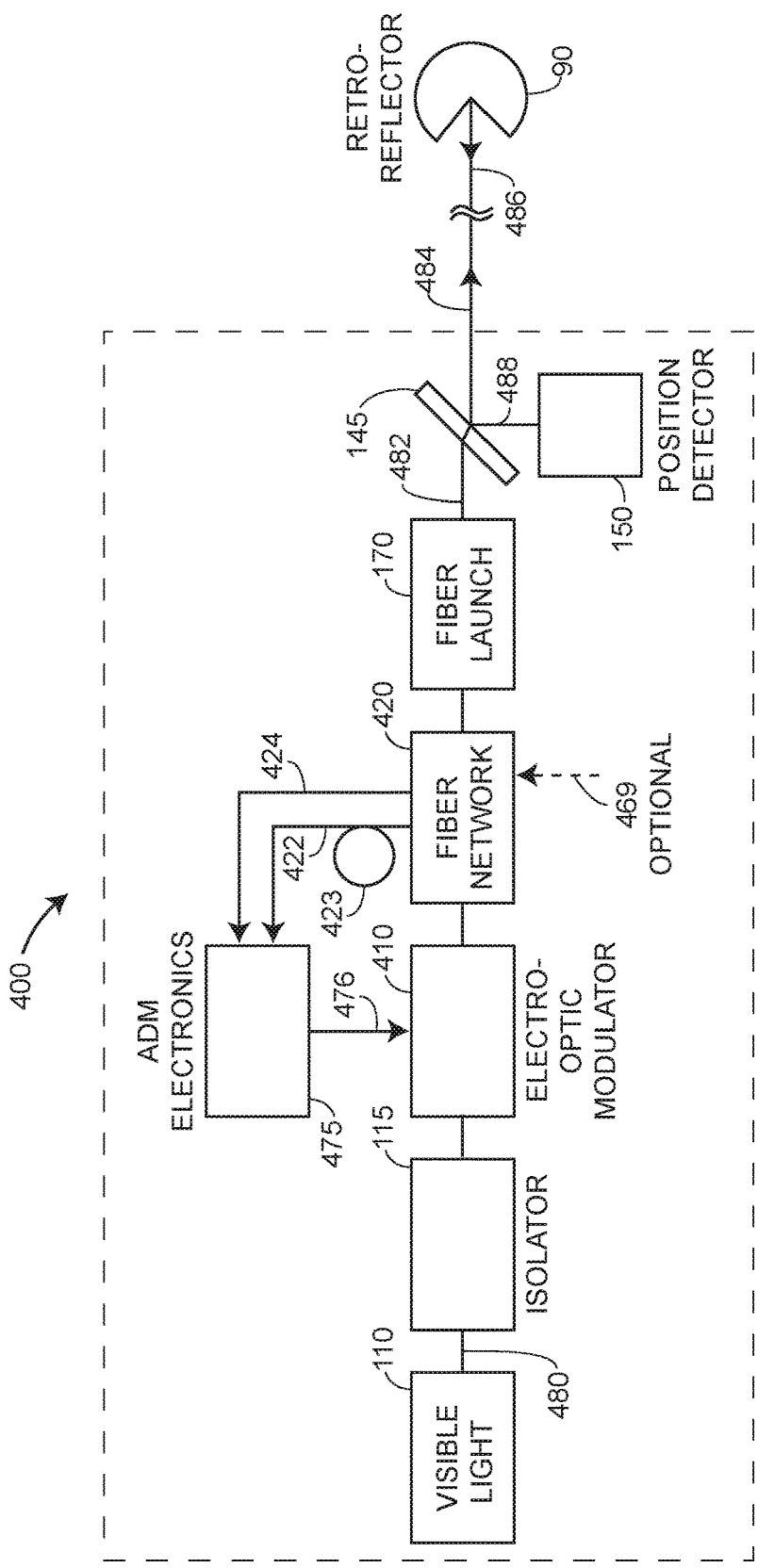
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
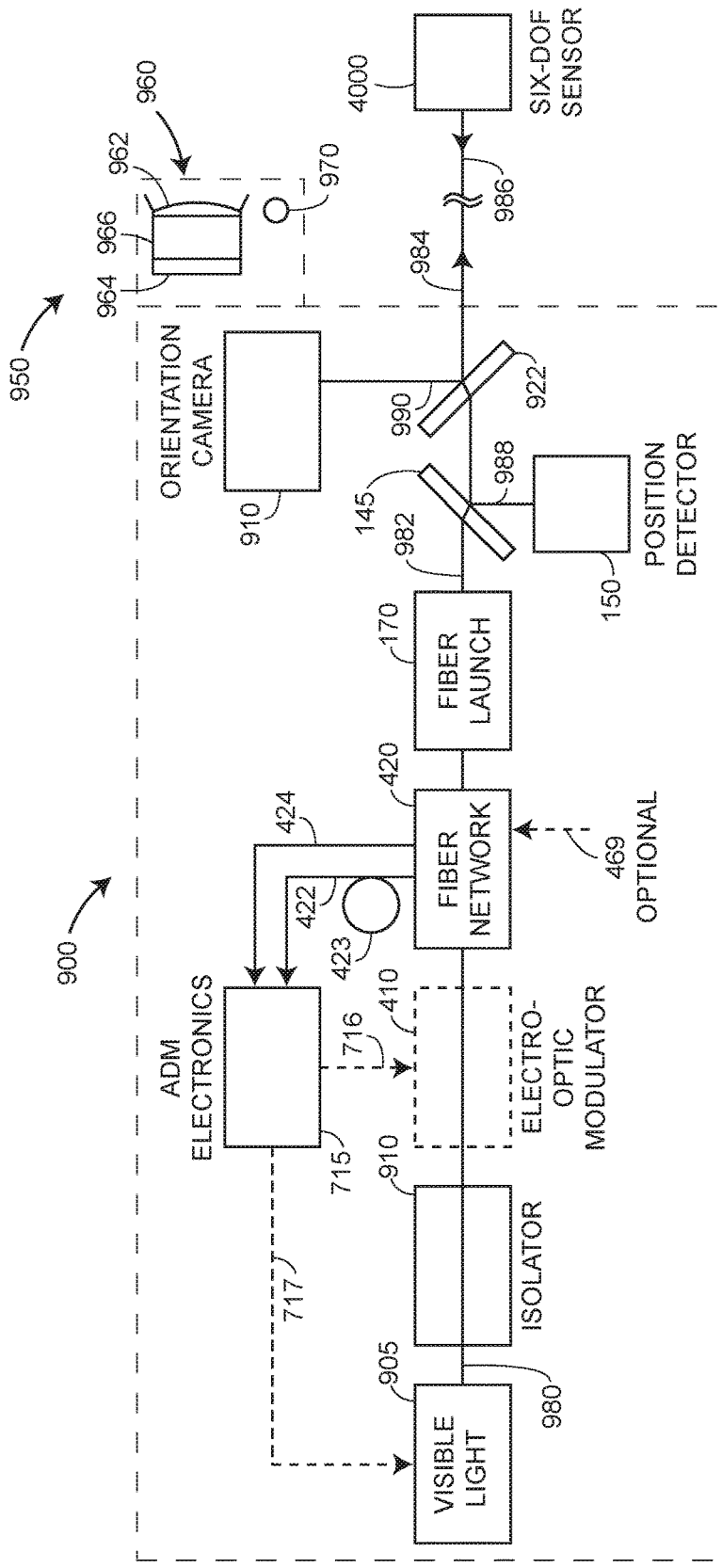
FIG. 13 is a block diagram of elements in a laser tracker.

FIG. 13 shows an embodiment of a locator camera system 950 and an optoelectronic system 900 in which an orientation camera 910 is combined with the optoelectronic functionality of a 3D laser tracker to measure six degrees of freedom of a device. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the laser tracker to a six degree-of-freedom (DOF) device 4000. The six-DOF device 4000 may be a probe, a projector, a sensor, or some other type of six-DOF device. In various embodiments, the six-DOF device 400 comprises a six-DOF triangulation scanner such as, for example, a laser line probe (LLP) or a structured light area scanner. The six-DOF triangulation scanner has a retroreflector attached thereto to facilitate measuring or determining of the six degrees of freedom of the scanner.

On its return path to the laser tracker, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe device is found. The principles of the orientation camera are described in the aforementioned patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown with respect to the laser tracker 10 in FIG. 1, where the cameras are elements 52 and the light sources are elements 54. The camera 960 includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems 950 are available on the laser tracker 10, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14:
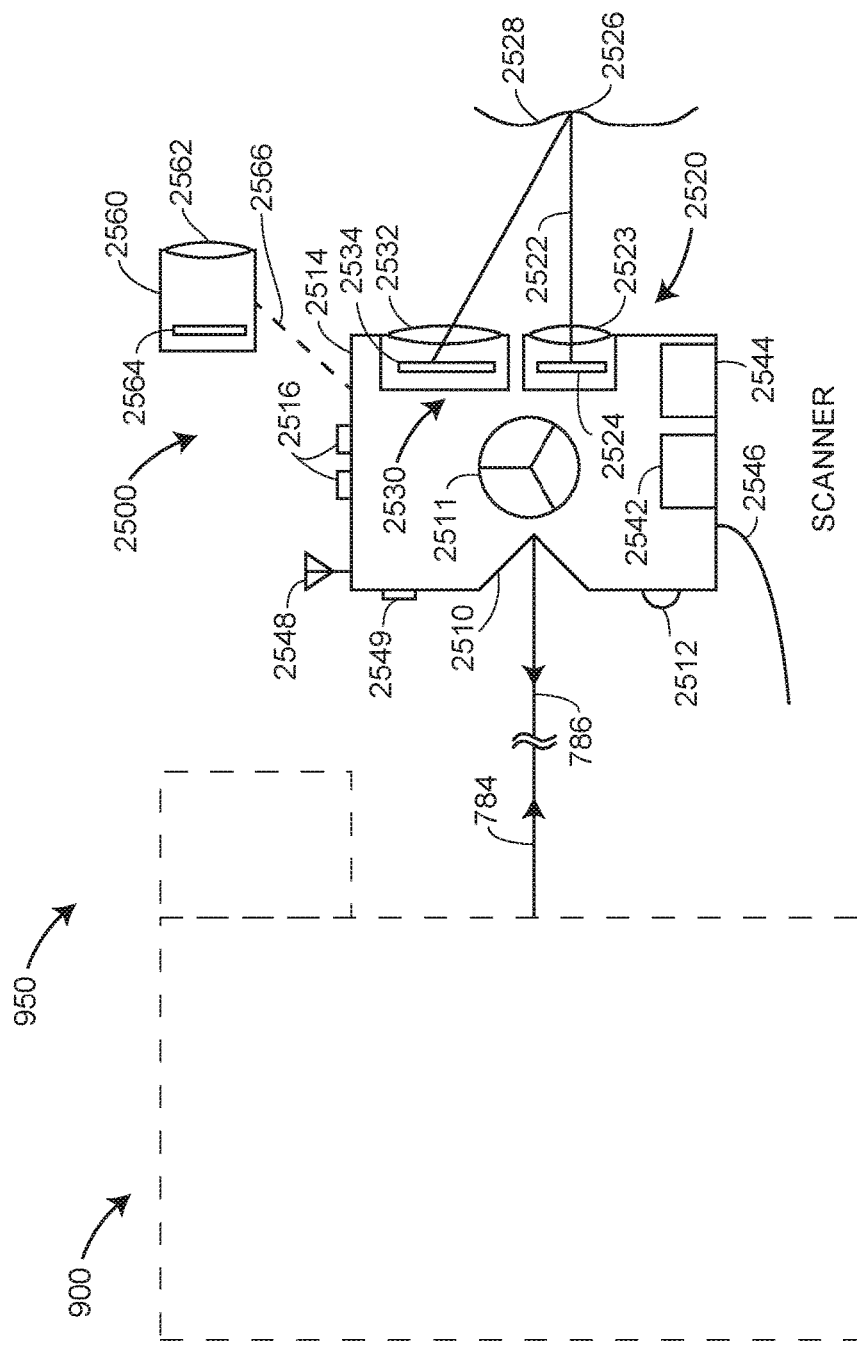
FIG. 14 is a block diagram of elements in a laser tracker according to an embodiment of the present invention.

FIG. 14 shows an embodiment of a three-DOF triangulation scanner 2500 used in conjunction with an optoelectronic system 900 and a locator camera system 950. The scanner 2500 may also be referred to as a "target scanner." The optoelectronic system 900 and the locator camera system 950 were discussed in reference to FIG. 13. In another embodiment, the optoelectronic system 900 is replaced by the optoelectronic system that uses two or more wavelengths of light. The scanner 2500 includes a body 2514, one or more retroreflectors 2510, 2511 a scanner camera 2530, a scanner light projector 2520, an optional electrical cable 2546, an optional battery 2444, an interface component 2512, an identifier element 2549, actuator buttons 2516, an antenna 2548, and an electronics circuit board 2542. Together, the scanner projector 2520 and the scanner camera 2530 are used to measure the three-dimensional coordinates of a workpiece 2528.

The three degrees of freedom of the scanner 2500 measured by the laser tracker may be considered to comprise three translational degrees of freedom. The three translational degrees of freedom may include a radial distance measurement between the laser tracker and a retroreflector, a first angular measurement, and a second angular measurement. The radial distance measurement may be made with an IFM or an ADM within the laser tracker. The first angular measurement may be made with an azimuth angular measurement device, such as an azimuth angular encoder, and the second angular measurement made with a zenith angular measurement device, such as a zenith angular encoder. Alternatively, the first angular measurement device may be the zenith angular measurement device and the second angular measurement device may be the azimuth angular measurement device. The radial distance, first angular measurement, and second angular measurement constitute three coordinates in a spherical coordinate system, which can be transformed into three coordinates in a Cartesian coordinate system or another coordinate system.

The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a two-dimensional (2D) structured pattern of light, either coded or uncoded, as discussed in more detail hereinafter. If the scanner emits a line of light, the scanner may be referred to as a "laser line probe" (LLP). On the other hand, if the scanner emits a 2D structured pattern of light, the scanner may be referred to as a "structured light scanner." The structured light pattern may be one of various patterns such as, for example, those patterns disclosed in the journal article "DLP-Based Structured Light 3D Imaging Technologies and Applications," by Jason Geng, published in the Proceedings of SPIE, Vol. 7932, which is incorporated herein by reference.

In general, there are two categories of structured light, namely coded and uncoded structured light. A common form of uncoded structured light relies on a striped pattern varying in a periodic manner along one dimension. These types of patterns are usually applied in a sequence to provide an approximate distance to the object. Some uncoded pattern embodiments, such as sinusoidal patterns for example, may provide relatively highly accurate measurements. However, for these types of uncoded patterns to be effective, it is usually necessary for the scanner device and the object to be held stationary relative to each other. Where the scanner device or the object are in motion (relative to the other), then a coded pattern may be used. A coded pattern allows the image to be analyzed using a single acquired image. Some coded patterns may be placed in a particular orientation on the projector pattern (for example, perpendicular to epipolar lines on the projector plane), thereby simplifying analysis of the three-dimensional surface coordinates based on a single image.

The light from projector 2520 is reflected from a surface of the workpiece 2528 and the reflected light is received by the camera 2530. It should be appreciated that variations or features in the workpiece surface, such as one or more protrusions for example, create distortions in the structured pattern when the image of the pattern is captured by the camera 2530. Since the pattern is formed by structured light, it is possible in some instances for a controller to determine a one to one correspondence between the pixels in the emitted pattern and the pixels in the imaged pattern. This enables triangulation principals to be used to determine the coordinates of each pixel in the imaged pattern. The collection of 3D coordinates of the workpiece surface is sometimes referred to as a point cloud. By moving the scanner 2500 over the surface, such as with a spindle for example, a point cloud may be created of the entire workpiece 2528.

If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, a liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the scanner from a variety of directions, thereby giving greater flexibility in the directions to which light may be projected by the projector 2500.

The scanner 2500 may be held by hand or mounted, for example, on a tripod, an instrument stand, a motorized carriage, or a robot end effector. The three-dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two-dimensional array, then one dimension of the two-dimensional array 2534 corresponds to a direction of a point 2526 on the surface of the workpiece 2528. The other dimension of the two-dimensional array 2534 corresponds to the distance of the point 2526 from the scanner light source 2520. Hence the three-dimensional coordinates of each point 2526 along the line of light emitted by scanner light source 2520 is known relative to the local frame of reference of the scanner 2500. From the three degrees of freedom, the three-dimensional coordinates of the scanned line of light may be found in the tracker frame of reference, which in turn may be converted into the frame of reference of the workpiece 2528 through the measurement by the laser tracker of three points on the workpiece, for example.

If the scanner 2500 is held by hand, a line of laser light emitted by the scanner light source 2520 may be moved in such a way as to "paint" the surface of the workpiece 2528, thereby obtaining the three-dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three-dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the scanner 2500 is moved by hand at a reasonable speed.

Projecting a structured light pattern, as opposed to a line of light, has some advantages. In a line of light projected from a handheld scanner 2500 such as an LLP, the density of points may be high along the line but much less between the lines. With a structured light pattern, the spacing of points is usually about the same in each of the two orthogonal directions. In addition, in some modes of operation, the three-dimensional points calculated with a structured light pattern may be more accurate than other methods. For example, by fixing the scanner 2500 in place, for example, by attaching it to a stationary stand or mount, a sequence of structured light patterns may be emitted that enable a more accurate calculation than would be possible other methods in which a single pattern was captured (i.e., a single-shot method). An example of a sequence of structured light patterns is one in which a pattern having a first spatial frequency is projected onto the object. In an embodiment, the projected pattern is a pattern of stripes that vary sinusoidally in optical power. In an embodiment, the phase of the sinusoidally varying pattern is shifted, thereby causing the stripes to shift to the side. For example, the pattern may be made to be projected with three phase angles, each shifted by 120 degrees relative to the previous pattern. This sequence of projections provides enough information to enable relatively accurate determination of the phase of each point of the pattern, independent of the background light. This can be done on a point by point basis without considering adjacent points on the object surface.

Although the procedure above determines a phase for each point with phases running from 0 to 360 degrees between two adjacent lines, there may still be a question about which line is which. A way to identify the lines is to repeat the sequence of phases, as described above, but using a sinusoidal pattern with a different spatial frequency (i.e., a different fringe pitch). In some cases, the same approach needs to be repeated for three or four different fringe pitches. The method of removing ambiguity using this method is well known in the art and is not discussed further here.

To obtain the best possible accuracy using a sequential projection method such as the sinusoidal phase-shift method described above, it may be advantageous to minimize the movement of the scanner. Although the position of the scanner is known from the measurements made by the laser tracker and although corrections can be made for movements of a handheld scanner, the resulting noise will be somewhat higher than it would have been if the scanner were kept stationary by placing it on a stationary mount, stand, or fixture.

Figure 15A:
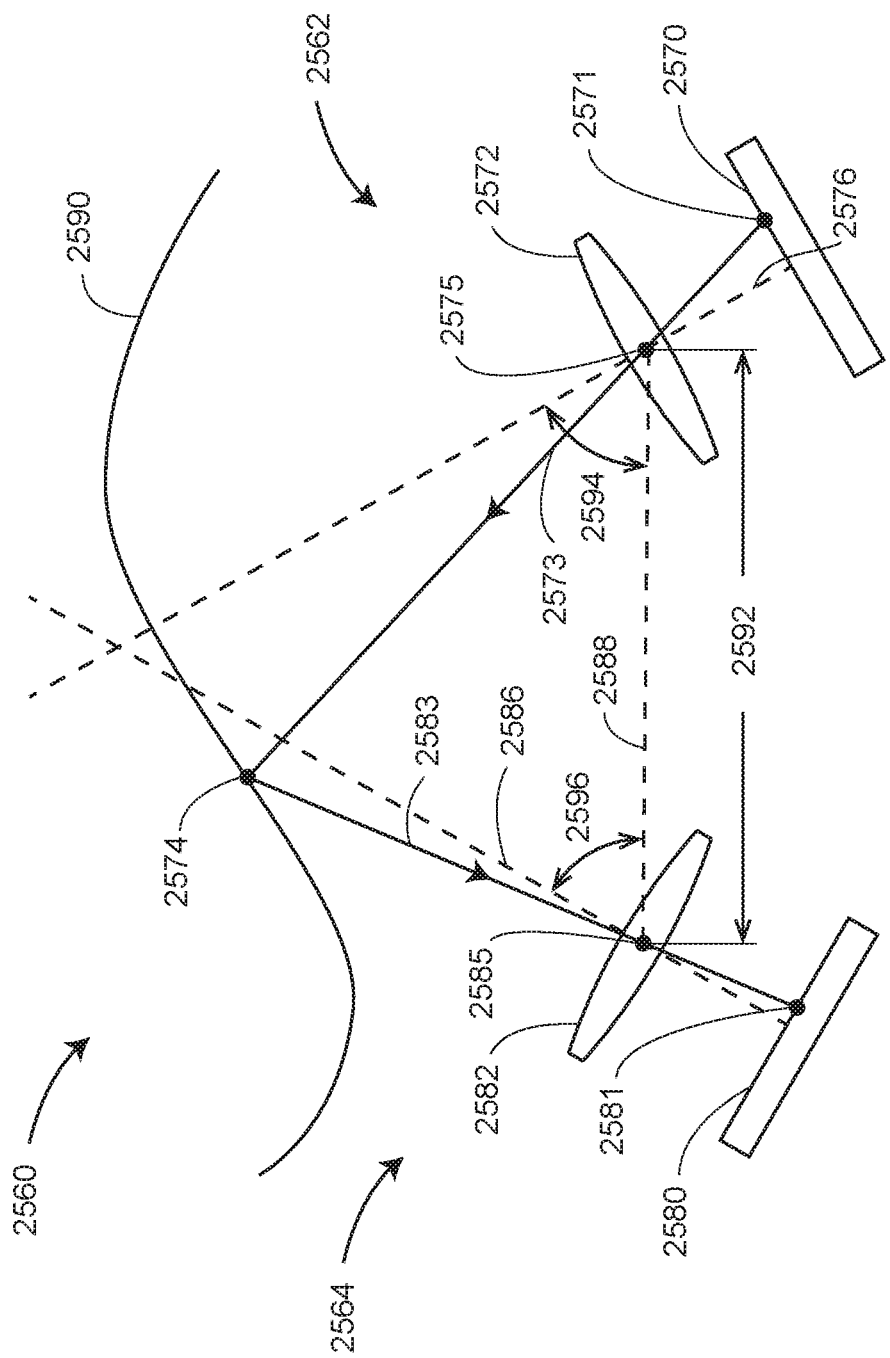
FIGS. 15A and 15B are schematic representations illustrating the principles of operation of triangulation based scanning measurement systems.
Figure 15B:
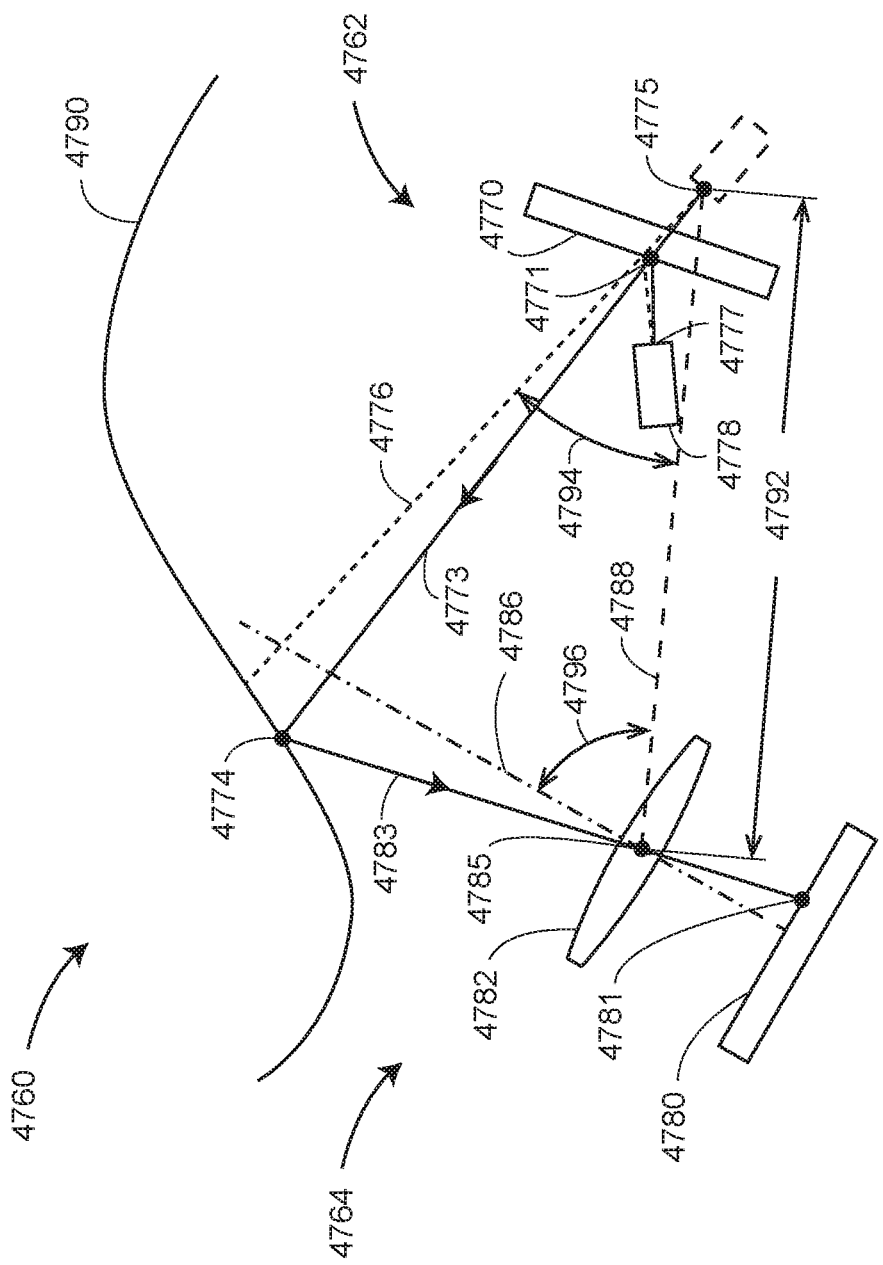

The scanning methods represented by FIGS. 15A and 15B are based on the principle of triangulation. A more complete explanation of the principles of triangulation are given with reference to the system 2560 of FIG. 15A and the system 4760 of FIG. 15B. Referring first to FIG. 15A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

The line segment that connects the perspective centers is the baseline 2588 in FIG. 15A and the baseline 4788 in FIG. 15B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 15B, the system 4760 is similar to the system 2560 of FIG. 15A except that the system 4760 does not include a lens. The system may include a projector 4762 and a camera 4764. In the embodiment illustrated in FIG. 15B, the projector includes a light source 4778 and a light modulator 4770. The light source 4778 may be a laser light source since such a light source may remain in focus for a long distance using the geometry of FIG. 15B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given hereinbelow for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 15A is obtained. It should be understood that this description provides a good first order approximation of the behavior of the light but that additional fine corrections can be made to account for lens aberrations that can cause the rays to be slightly displaced relative to positions calculated using the model of FIG. 15A. Although the baseline length, the baseline projector angle, and the baseline camera angle are generally used, it should be understood that saying that these quantities are required does not exclude the possibility that other similar but slightly different formulations may be applied without loss of generality in the description given herein.

When using a triangulation scanner, several types of scan patterns may be used, and it may be advantageous to combine different types to obtain the best performance in the least time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

A technique that may be used to simplify the matching of coded features is the use of epipolar lines. Epipolar lines are mathematical lines formed by the intersection of epipolar planes and the source plane 2570 or the image plane 2580. An epipolar plane is any plane that passes through the projector perspective center and the camera perspective center. The epipolar lines on the source plane and image plane may be parallel in some special cases, but in general are not parallel. An aspect of epipolar lines is that a given epipolar line on the projector plane has a corresponding epipolar line on the image plane. Hence, any particular pattern known on an epipolar line in the projector plane may be immediately observed and evaluated in the image plane. For example, if a coded pattern is placed along an epipolar line in the projector plane that the spacing between coded elements in the image plane may be determined using the values read out by pixels of the photosensitive array 2580 and this information used to determine the three-dimensional coordinates of an object point 2574. It is also possible to tilt coded patterns at a known angle with respect to an epipolar line and efficiently extract object surface coordinates.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

According to embodiments of the present invention, the triangulation scanner 2500 of FIG. 14 also includes an augmented reality (AR) camera 2560. The AR camera 2560 may be considered to be one that is capable of taking "full field" images. The AR camera 2560 includes a camera lens 2562 and a photosensitive array 2564. The photosensitive array 2564 may be a CCD or CMOS array, for example. Thus, the AR camera 2560 may be digital in nature, and may take still images or video images.

As shown in FIG. 14, the AR camera 2560 is connected by dashed lines 2566 to the body 2514 of the triangulation scanner 2500. However, this is for illustrative purposes only. The AR camera 2560 may be an integral part of the scanner body 2014. As used herein, the term "integral" is used to mean that the AR camera 2560 may be permanently or temporarily attached to the scanner body 2014 such that the AR camera 2560 is in a fixed spatial relationship with respect to the scanner body 2014. Either way, since the three degrees of freedom of the scanner 2500 are known as described above, the three degrees of freedom of the AR camera 2560 are also known for each image taken by the AR camera 2560. As such, the laser tracker, the triangulation scanner 2500, and the AR camera 2560 may all be placed into a common frame of reference.

Associated with the lens 2562 (which may be a lens system including a plurality of lens elements) is a perspective center of the lens. The rays of light passing through the lens 2562 may be considered to pass through the perspective center before arriving at the photosensitive array 2564. In a careful analysis, the lens 2562 may be characterized to account for lens aberrations, which result in a slight shift in the intersection positions of the rays on the photosensitive array 2564. However, without losing generality, it is possible to say that the rays pass through the perspective center, with aberration correction to the image provided in another step of image processing.

The surface of an object under investigation is imaged by the lens 2562 onto the photosensitive array 2564 to form an image on the collection of pixels that are a part of the photosensitive array 2564. Light falling on each pixel is converted, within an integration period of the camera, from a charge into a digital signal. An analog-to-digital converter, either located within the photosensitive array 2564 (for CMOS arrays) or external to the array 2564 (for CCD arrays), performs the conversion from analog to digital signal. The signal for each pixel is typically given in a binary representation of between 8 and 12 bits. The 1's and 0's represented by these bits are delivered over parallel channels, and may be converted into serial form using a serializer/deserializer capability for transmission over a bus line.

As discussed, the triangulation scanner 2500 is handheld in embodiments of the present invention. However, in other embodiments the scanner 2500 may be kept stationary by placing it on a stationary mount, stand, or fixture; for example a tripod. Further, although the position and orientation of the triangulation scanner 2500 are known from the measurements made by the laser tracker as described hereinabove and although corrections can be made for movements of a handheld scanner 2500, the resulting noise may be somewhat greater than it would have been if the scanner 2500 were kept stationary. It is also possible to mount the triangulation scanner 2500 on a robot or machine tool.

In embodiments of the present invention, multiple two-dimensional (2D) camera images taken by an augmented reality camera 2560 that is part of a triangulation scanner 2500 (which itself is used in conjunction with a laser tracker) are combined or "registered" together according to a method, described hereinbelow, to obtain a three-dimensional (3D) image representation of various real-world features such as, for example, a surface of an object or of some real-world scene (e.g., the inside of a building, the location of a vehicle accident, or a crime scene). This method is based on the fact that because the three degrees of freedom of the scanner 2500 having the integral AR camera 2560 is known for each 2D photograph or image taken by the AR camera 2560, a plurality of the 2D photographic images taken by the AR camera 2560 may be combined together to form a 3D image.

A method according to this embodiment is now described with reference to the method 1600 of FIG. 16. In a step 1605, a triangulation scanner 2500 and a coordinate measurement device are provided. The scanner 2500 also includes the retroreflector 2510 and an integral AR camera 2560, as described hereinabove with respect to FIG. 14. The coordinate measurement device, which may comprise a laser tracker such as the laser tracker 5 described hereinabove, has a device frame of reference and is separate from the triangulation scanner 2500. The coordinate measurement device includes a first and second motor, a first and second angle measuring device, a distance meter, a position detector, a control system, and a processor. The laser tracker and scanner with AR camera may be identical or similar to those described and illustrated hereinabove.

A step 1610 is, in a first instance, measuring with the device the two angles of rotation and distance to the retroreflector. In this step, a 2D image is also formed on the AR camera 2560. The electronics circuit board 2542 within the scanner 2500 may process and/or send the position information from the AR camera 2560. The electronics circuit board 2542 may also receive a first digital signal representing a 2D image sent through the camera lens 2562 onto the photosensitive array 2564.

In a step 1615, the triangulation scanner 2500 is moved to a new position, and the device measures the two angles and distance to the six-DOF scanner 2500. It also forms a 2D image at the new position. The electronics circuit board 2542 may process and/or send the position information from the AR camera 2560 at this second position to the laser tracker. The electronics circuit board 2542 may also receive a second digital signal representing the 2D image sent through the camera lens 2562 onto the photosensitive array 2564.

In a step 1620, a cardinal point in common to the first image and a second image is found. The term "cardinal point" is typically used to refer to points that are identified in images and that can be used to connect or register the images together. Also, these points are typically not placed intentionally at their locations by someone. The step includes determining the corresponding locations of a cardinal point on a photosensitive array in first and second instances. We may refer to the location of the cardinal point in the first instance as the first location and the location of the cardinal point in the second instance as the second location. There is a well-developed collection of techniques that may be used to determine such cardinal points, generally using methods referred to as image processing or feature detection. A commonly used but general category for finding cardinal points is referred to as interest point detection, with the points detected referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. In the step 1620, the processor finds those cardinal points common to the first and second images to obtain at least one cardinal point (but usually a large set of cardinal points). Other common feature detection methods for finding cardinal points include edge detection, blob detection, and ridge detection.

A step 1625 is determining the 3D coordinates of the corresponding cardinal points in the first and second 2D images within a first frame of reference. This determination may be made by first using triangulation to determine the 3D coordinates of the cardinal points in the first and second images in the frame of reference of the scanner 2500 and then using coordinate transformations to obtain the cardinal points in a first frame of reference, which might be the device frame of reference. These coordinate transformations are based at least in part on the two angle measurements and one distance measurement provided by the device. It is understood that, in this calculation, the position of the 2D camera 2560 within the scanner 2500 is known, for example, based on factory measurements. Based on the measured values, a baseline having a baseline distance may be drawn between the perspective centers of the camera in a first instance (corresponding to the first 2D image) and in a second instance (corresponding to the second 2D image). Because the baseline distance is known from the measurements by the tracker, each cardinal point is determined in 3D space in the first frame of reference. In general, the 3D coordinates of a cardinal point in the first image and the 3D coordinates of a corresponding cardinal point in the second image will not match exactly. However, averaging of the 3D coordinates or similar methods may be used to determine a representative 3D coordinate in the first frame of reference for the corresponding cardinal points in the first and second 2D images. If this method is used, then the 3D coordinates are properly scaled, which is to say that 3D coordinates have the correct units of length within the first frame of reference. This is in contrast to a method of obtaining two images with a camera held in two different positions for which the positions of the camera perspective center in each case is unknown. This method does not provide enough information to properly scale a 3D image (in units of length).

A step 1630 is creating a composite 3D image based at least in part on the first and second 2D images and on the 3D coordinates of the cardinal points in the first frame of reference. In most cases, the first and second 2D images will share many cardinal points, and for each of these 3D coordinates can be obtained. These cardinal points form the framework for a 3D representation onto which other image elements may be interpolated between the two 2D images or among multiple 2D images (in a more general case). Besides providing 3D coordinate information, a composite 3D image may also convey texture and color information obtained not only from cardinal points but also from visible regions between the cardinal points, again using interpolation methods. The 3D coordinates obtained in the step 1625 and 1630 are the same for the corresponding cardinal points in the first and second images; however, the composite 3D image may contain additional 3D information, for example, by interpolation between cardinal points, and by adding color and texture information.

A step 1635 is storing the composite 3D image.

Although not included in the procedure 1600 of FIG. 16, it is clear that the method described hereinabove may be extended to an arbitrarily large number of photosensitive array images so that sets of cardinal points may be obtained from multiple images. In this case, each cardinal point may correspond to cardinal points on several of the images obtained with the photosensitive array 2564 in different positions of the AR camera 2560. For a given cardinal point, the points of intersection of the multiple lines projected from the photosensitive array 2564 through the perspective centers of the camera lens 2562 may be determined using a best-fit method according to methods of optimization well known in the art, for example, by using least-squares minimization methods. Additional optimization of registration of the multiple images may be carried out, if desired, by providing targets on or near the object under test. Additional targets may be reflective targets or light emitting diodes, for example.

If the AR camera 2560 is a color camera, the reconstructed 3D surface may be represented in color, or other texture attributes may be retrieved. Various features of a light pattern, in addition to a 3D surface profile, may be provided by this method 1600 in other embodiments. For example, an "X" marked on the surface of an object may be retrieved in addition to the general coordinates corresponding to the location of the "X."

In some cases, it may be known ahead of time that certain portions of surfaces being photographed are relatively smooth. In other words, these portions do not have any sharp discontinuities or fine features. In these cases, it may be possible to use the established cardinal points to construct an unmeasured portion of the surface in three dimensions. For example, the cardinal points may fit smoothly onto a cylindrical shape over a portion of the surface, and so software may automatically provide the cylindrical shape.

In the case that an overall shape for a portion of a surface is known, it may be possible to project a captured image onto the surface. For example, suppose that the surface has a colored pattern that may be projected onto an assumed surface, which in a particular case might be a flat surface, for example. In this case, this pattern may be projected onto the assumed surface from each of images obtained for the AR camera 2560 in different positions. In this instance, the images would be expected to overlap on the surface. If this is not the case, it would indicate that the assumed shape is not correct, and a change to the shape should be made. In this instance, it may be a good practice to obtain additional cardinal points based on the images captured by the AR camera 2560 in the different positions. These additional cardinal points may then be used to more accurately determine the surface profile.

An AR camera 2560 may be used to capture background images, for example of relatively distant background objects over a relatively large field of view and it may also be used to capture foreground images, which may be, for example, images of an object being scanned by the triangulation scanner 2500.

Figure 16:
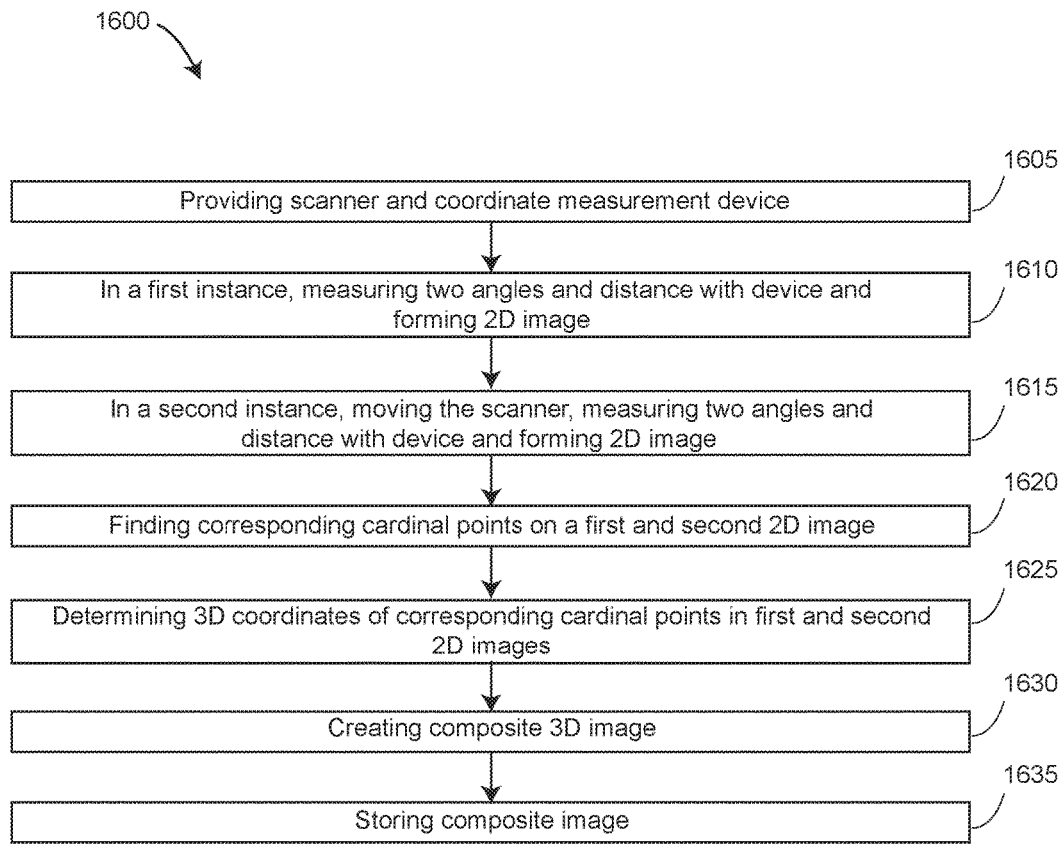
FIG. 16 is a flow chart that includes steps in a method of obtaining a three-dimensional representation of a surface using an augmented reality camera attached to a triangulation scanner according to an embodiment of the present invention.

As can be seen from the foregoing "dynamic triangulation" method 1600 as illustrated in FIG. 16, the images taken by the AR camera 2560 at various camera positions are registered together based in part on knowledge of the three degrees of freedom provided by the laser tracker. As such, it is possible to register the 2D images from the AR camera 2560 with proper dimensional scale and with fewer camera images that would otherwise be possible.

Once the 3D images have been created by embodiments of the present invention, these images may have data overlaid or superimposed thereon. For example, if the 3D images are those of an object being built or already built, the data superimposed on the 3D images may comprise CAD design data of the object. The CAD data may be stored in memory associated with the laser tracker 5 (FIG. 1). Other types of data may be superimposed on the camera images such as, for example, marks to indicate where various assembly operations (drilling, attaching, etc.) are to be performed.

An AR camera 2562 in a triangulation scanner 2500 may be used to measure surroundings instead of (or in addition to) a part being measured with the scanner 2500. For example, the AR camera 2560 may have a relatively long focal length that enables it to clearly image its surroundings to a relatively greater extent that the camera 2530 associated with the triangulation scanner 2500 is able to image. Reconstruction methods described hereinabove may be used to obtain a 3D representation of the surroundings based on the AR camera images. For example, one or more parts measured to an accuracy of a few micrometers or tens of micrometers with the scanner 2500 may be placed within surroundings measured to an accuracy of a few millimeters based on the AR camera images.

Software may be used to observe the object and the surroundings from different perspectives and different distances, with the parallax shift between the object and surroundings properly represented. In some cases, the background information may be important. For example, a project may involve attaching a structure to the object being measured while confirming that there is adequate room in the 3D surroundings having a 3D image obtained with the AR camera 2560. Such a structure may be available as a CAD model, as a scanned image of a part or assembly, or as a scaled 3D representation obtained through the use of multiple camera images.

In some cases, the AR camera 2560 may be used to obtain representations of areas ordinarily obstructed from view. For example, the AR camera may be used to view all sides of an object to obtain 3D images of regions not easily measured with a scanner 2500. Such full coverage from all directions is particularly useful when images are displayed—for example, in a presentation, on a website, or in a brochure. The addition of color (texture) from the AR camera 2560 also of value in this instance. 3D representations obtained from the AR camera 2560 may be supplemented by other 3D representations. Models of parts, assemblies, furniture, and so forth, may in some cases be downloaded from files or websites and incorporated into a composite 3D representation.

Another important use for the AR camera 2030 and triangulation scanner 2500 is to obtain proper scaling of surroundings. For example, a wall may have a left side, a right side, an upper side, and a lower side. Although the method of matching cardinal points described hereinabove provides scaled 3D images, the dimensional accuracy will generally be much better is 3D coordinates are measured with the scanner 2500 than with camera images alone. By combining the composite 3D image obtained from the 2D AR camera images with a few measurements with the triangulation scanner 2500, the scaling accuracy of the composite 3D image can, in many cases, be greatly improved. For example, improved scale of a building may be obtained by measuring one or more positions on each of the left, right, upper, and lower sides with the scanner 2500.

The AR camera 2560 may be used to measure only surroundings, only objects, or both surroundings or objects. As the term is used here, the word "object" means an item for which accurate dimensional information is desired. An object is typically measured by the triangulation scanner 2500 which has accuracy on the order of a few tens of micrometers. Measurement by an AR camera 2560 provides the ability to superimpose images on drawings (for example, CAD). In addition, by obtaining 2D images of an object from multiple directions, it is possible to provide an overlay to an object from all directions.

An object may be placed within its surroundings, the 3D coordinates of which are obtained through the use of the AR camera 2560. With the information provided by the AR camera and triangulation scanner 2500, it is possible to view the objects from a variety of perspectives relative to its surroundings and also to view an object or its surroundings from all directions.

In an embodiment, a purely graphical element (which could be a photographic element, a drawn element, or a rendered element, for example) is placed within a composite image. A first example of such a graphical element is an addition to a machine tool on a factory floor. Such an addition may be superimposed on a CAD model to which a composite color image is overlaid. The addition might be a new machined part. A collection of such additions may be placed in the context of a factory environment to ensure that all elements fit properly. A second example of such a graphical element is a new item of machinery or furniture placed in the same factory environment. A question might be whether such an element will fit in the new plans. In some cases, web sites may be available that enable downloading of such 3D images from the Cloud, which is a network typically found on the Internet through a service provider. With some user interfaces, such a 3D component may be moved into position with a computer mouse and then viewed from different positions and orientations.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of combining a plurality of two-dimensional (2D) images into a three-dimensional (3D) image of an object, the method comprising steps of:
providing a six-degree of freedom triangulation scanner having a retroreflector and a camera;
providing a laser tracker device having a distance meter, the device operable to direct a beam of light in a direction and measure a distance from the device to the retroreflector, the device further configured to determine 3D coordinates of the retroreflector;
determining with the device a first 3D coordinates of the retroreflector at a first position;
forming a first 2D image with the camera at the first position;
determining with the device a second 3D coordinates of the retroreflector at a second position;
forming a second 2D image with the camera at the second position;
determining a first common feature point in the first 2D image and the second 2D image;
determining 3D coordinates of the first common feature point based at least in part on the first 3D coordinates and the second 3D coordinates;
generating a first composite 3D image from the first 2D image and the second 2D image based at least in part on the 3D coordinates of the first common feature point; and
storing in a memory the first composite 3D image.

2. The method of claim 1, wherein the second 2D image at least partially overlapping the first 2D image, and the first common feature point is located in an overlapping portion.

3. The method of claim 1, wherein the determining of the first common feature point is performed using interest point detection.

4. The method of claim 3, wherein the first common feature point is a corner point.

5. The method of claim 1, wherein the determining of the common feature point is performed using one of edge detection, blob detection or ridge detection.

6. The method of claim 1, further comprising:
determining a plurality of common feature points;
wherein the first 2D image, the second 2D image, and the first composite 3D image are color images.

7. The method of claim 6, further comprising obtaining texture and color information from visible regions between the plurality of common feature points.

8. The method of claim 7, wherein the obtaining of texture and color information is performed using interpolation.

9. A method of combining a plurality of two-dimensional (2D) images into a three-dimensional (3D) image of an object, the method comprising:
providing a six-degree of freedom triangulation scanner having a retroreflector and a camera;
providing a laser tracker device having a distance meter, the device operable to direct a beam of light in a direction and measure a distance from the device to the retroreflector, the device further configured to determine 3D coordinates of the retroreflector;
determining with the device a first 3D coordinates of the retroreflector at a first position;
forming a first 2D image with the camera at the first position;
determining with the device a second 3D coordinates of the retroreflector at a second position;
forming a second 2D image with the camera at the second position;
determining a first common feature point in the first 2D image and the second 2D image;
determining 3D coordinates of the first common feature point based at least in part on the first 3D coordinates and the second 3D coordinates;
generating a first composite 3D image from the first 2D image and the second 2D image based at least in part on the 3D coordinates of the first common feature point
storing in a memory the first composite 3D image; and
determining a plurality of 3D coordinates of the object with the triangulation scanner; and
determining a scale of the composite 3D image based at least partially on the plurality of 3D coordinates.

10. A system for combining a plurality of two-dimensional (2D) images into a three-dimensional (3D) image of an object, the system comprising:
a six-degree of freedom triangulation scanner having a retroreflector and a camera;
a laser tracker device having a distance meter, the device operable to direct a beam of light to a direction and measure a distance from the device to the retroreflector, the device further operable to determine a 3D coordinates of the triangulation scanner; and
one or more processors responsive to nontransitory executable computer instructions, the one or more processors electrically coupled to the triangulation scanner and the device, the nontransitory executable computer instructions comprising:
determining with the device a first 3D coordinates of the retroreflector at a first position;
forming a first 2D image with the camera at the first position;
determining with the device a second 3D coordinates of the triangulation scanner at a second position;
forming a second 2D image with the camera at the second position;
determining a first common feature point in the first 2D image and the second 2D image;
determining 3D coordinates of the first common feature point based at least in part on the first set of 3D coordinates and the second set of 3D coordinates;
creating a first composite 3D image from the first 2D image and the second 2D image based at least in part on the 3D coordinates of the first common feature point in the first frame of reference; and
storing in a memory the first composite 3D image.

11. The system of claim 10, wherein the second 2D image at least partially overlapping the first 2D image, and the first common feature point is located in an overlapping portion.

12. The system of claim 11, wherein the second 2D image at least partially overlapping the first 2D image, and the first common feature point is located in an overlapping portion.

13. The system of claim 10, wherein the determining of the first common feature point is performed using interest point detection.

14. The system of claim 13, wherein the first common feature point is a corner point.

15. The system of claim 10, wherein the determining of the common feature point is performed using one of edge detection, blob detection or ridge detection.

16. The system of claim 10, wherein the nontransitory executable computer instructions further comprise:
   determining a plurality of common feature points; and
   wherein the first 2D image, the second 2D image and the first composite 3D image are color images.

17. The system of claim 16, wherein the nontransitory executable computer instructions further comprise obtaining texture and color information from visible regions between the plurality of common feature points.

18. The system of claim 17, wherein the obtaining of texture and color information is performed using interpolation.

19. The system of claim 10, wherein the nontransitory executable computer instructions further comprise:
   determining a plurality of 3D coordinates of the object with the triangulation scanner; and
   determining a scale of the composite 3D image based at least partially on the plurality of 3D coordinates.

* * * * *